US012811047B2

(12) United States Patent
Ito et al.

(10) Patent No.: US 12,811,047 B2
(45) **Date of Patent: *Nov. 24, 2026**

(54) ELECTRONIC COMPONENT AND MANUFACTURING METHOD THEREOF

(71) Applicant: Murata Manufacturing Co., Ltd., Kyoto-fu (JP)

(72) Inventors: Hiromitsu Ito, Nagaokakyo (JP); Yuichi Iida, Nagaokakyo (JP); Isamu Utsunomiya, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 732 days.

This patent is subject to a terminal disclaimer.

(21) Appl. No.: 18/345,745

(22) Filed: Jun. 30, 2023

(65) Prior Publication Data

US 2024/0038430 A1 Feb. 1, 2024

(30) Foreign Application Priority Data

Jul. 29, 2022 (JP) ................................ 2022-121923

(51) Int. Cl.
*H01F 17/02* (2006.01)
*H01F 17/00* (2006.01)
(Continued)

(52) U.S. Cl.
CPC ......... *H01F 17/02* (2013.01); *H01F 17/0013* (2013.01); *H01F 27/022* (2013.01);
(Continued)

(58) Field of Classification Search
CPC .... H01F 17/02; H01F 17/0013; H01F 27/022; H01F 41/043; H01F 2017/002;
(Continued)

(56) References Cited

U.S. PATENT DOCUMENTS

2013/0222101 A1* 8/2013 Ito ............................ H01F 3/08 336/83
2015/0334823 A1* 11/2015 Hu ....................... H05K 1/0271 361/783
(Continued)

FOREIGN PATENT DOCUMENTS

JP 2010-153745 A 7/2010
JP 2013-098350 A 5/2013
(Continued)

*Primary Examiner* — Shawki S Ismail
*Assistant Examiner* — Kazi S Hossain
(74) *Attorney, Agent, or Firm* — Studebaker Brackett PLLC

(57) ABSTRACT

An electronic component includes a glass substrate having a main body and a protrusion, the main body including top and bottom surfaces, and a first side surface connecting the bottom and top surfaces to each other, the first side surface of the main body being provided with the protrusion; a colored insulation layer on at least the first side surface of the main body; and a through-conductor within the main body and extending through the top surface and the bottom surface. The protrusion extends in a first direction that is orthogonal to the top surface, as viewed from a direction orthogonal to the first side surface. As viewed from the direction orthogonal to the first side surface, at least a portion of the colored insulation layer extends in the first direction and is adjacent to the protrusion in a second direction that is orthogonal to the first direction.

15 Claims, 21 Drawing Sheets

(51) Int. Cl.

| | |
|---|---|
| ***H01F 27/02*** | (2006.01) |
| ***H01F 41/04*** | (2006.01) |
| ***H01G 4/224*** | (2006.01) |
| ***H01G 4/33*** | (2006.01) |

(52) U.S. Cl.

CPC ........... *H01F 41/043* (2013.01); *H01G 4/224* (2013.01); *H01G 4/33* (2013.01); *H01F 2017/002* (2013.01)

(58) Field of Classification Search

CPC ...... H01F 41/042; H01F 41/00; H01F 27/292; H01F 2017/004; H01F 27/00; H01G 4/224; H01G 4/33; H01G 2/00; H01G 13/003; H01G 4/236; G01N 21/01

USPC ........................... 336/221, 83, 5, 55–60, 170

See application file for complete search history.

(56) References Cited

U.S. PATENT DOCUMENTS

| | | | | |
|---|---|---|---|---|
| 2017/0154720 | A1* | 6/2017 | Ohkubo .................. | H01F 17/04 |
| 2021/0174996 | A1 | 6/2021 | Song et al. | |
| 2022/0084733 | A1* | 3/2022 | Iida ..................... | H01F 17/0006 |

FOREIGN PATENT DOCUMENTS

| | | | |
|---|---|---|---|
| JP | 2016-157982 | A | 9/2016 |
| JP | 2022-050298 | A | 3/2022 |

* cited by examiner

ELECTRONIC COMPONENT AND MANUFACTURING METHOD THEREOF

CROSS-REFERENCE TO RELATED APPLICATION

This application claims benefit of priority to Japanese Patent Application No. 2022-121923, filed Jul. 29, 2022, the entire content of which is incorporated herein by reference.

BACKGROUND

Technical Field

The present disclosure relates to electronic components and manufacturing methods thereof.

Background Art

An electronic component in the related art is described in Japanese Unexamined Patent Application Publication No. 2013-98350. This electronic component includes a glass body and a conductor provided inside the glass body.

SUMMARY

Glass is advantageous for being insulative and for being physically and chemically stable, and is thus widely used as insulators and structures of electronic components. In particular, the electronic component in the related art that has the conductor incorporated inside the glass body is suitable for use as a compact high-frequency-signal inductor component that requires a non-magnetic structure.

On the other hand, highly-transparent glass used as the glass may be problematic due to being transparent. For example, a mounter in recent years often has a function for detecting, for example, the presence or absence of an electronic component or the thickness of the electronic component by detecting a side surface of the electronic component by using a laser sensor or a camera. A transparent electronic component using glass is problematic in being difficult to be recognized by the laser sensor or the camera of the mounter. There is also a problem in terms of a difficulty in, for example, appearance inspection using a camera.

Accordingly, the present disclosure provides an electronic component and a manufacturing method thereof that facilitate detection by a detector, such as a laser sensor or a camera.

An electronic component according to an aspect of the present disclosure includes a glass substrate, a colored insulation layer, and a through-conductor. The glass substrate has a main body and a protrusion. The main body includes a top surface, a bottom surface, and a first side surface connecting the bottom surface and the top surface to each other. The first side surface of the main body is provided with the protrusion. The colored insulation layer is provided on at least the first side surface of the main body. The through-conductor is provided within the main body and extends through the top surface and the bottom surface. The protrusion extends in a first direction that is orthogonal to the top surface, as viewed from a direction orthogonal to the first side surface. As viewed from the direction orthogonal to the first side surface, at least a portion of the colored insulation layer extends in the first direction and is disposed adjacent to the protrusion in a second direction that is orthogonal to the first direction.

As viewed from the direction orthogonal to the first side surface, the extending direction of the protrusion may be not only aligned completely with the first direction but also aligned substantially with the first direction. For example, an inclination angle formed between the extending direction of the protrusion and the first direction may be 100 or smaller. The same applies to the extending direction of the colored insulation layer.

According to the above aspect, the colored insulation layer is provided on at least the first side surface of the main body of the glass substrate, so that when the electronic component is to be detected from the first side surface of the main body by using a detector, such as a laser sensor or a camera, the colored insulation layer with low transparency can be readily recognized, whereby the electronic component can be readily detected.

Furthermore, as viewed from the direction orthogonal to the first side surface, the colored insulation layer extends in the first direction, so that when the electronic component is to be detected by scanning the detector in the first direction, the colored insulation layer can be readily recognized, whereby the electronic component can be readily detected.

Moreover, since the colored insulation layer is provided on at least the first side surface of the main body of the glass substrate, the exposed area of the main body can be reduced, and the mechanical strength of the electronic component against an external force can be increased.

Preferably, in the electronic component according to an embodiment, an area where the first side surface does not have the protrusion is entirely provided with the colored insulation layer.

According to the above embodiment, the surface area of the colored insulation layer on the first side surface can be increased. Accordingly, the electronic component can be detected more readily by the detector, and the mechanical strength of the electronic component can be further increased.

Preferably, in the electronic component according to an embodiment, the main body further includes a second side surface and a corner between the first side surface and the second side surface. The second side surface connects the bottom surface and the top surface to each other and is adjacent to the first side surface in a circumferential direction, as viewed from a direction orthogonal to the bottom surface. The colored insulation layer is continuously provided on the first side surface, the corner, and the second side surface.

According to the above embodiment, since the colored insulation layer is continuously provided on the first side surface, the corner, and the second side surface, chipping and cracking can be suppressed at the corner where chipping and cracking tend to occur.

Preferably, in the electronic component according to an embodiment, the main body further includes a second side surface and a corner between the first side surface and the second side surface. The second side surface connects the bottom surface and the top surface to each other and is adjacent to the first side surface in a circumferential direction, as viewed from a direction orthogonal to the bottom surface. The corner has a curved surface.

According to the above embodiment, since the corner has a curved surface, chipping and cracking of the corner can be further suppressed. Furthermore, the volume of glass at the corner is reduced, as compared with a case where the corner is a ridge, so that the possibility of an occurrence of stray capacitance can be reduced at the corner.

Preferably, the electronic component according to an embodiment further includes an outer-surface conductor that is disposed above at least one of the top surface and the bottom surface and that is electrically connected to the through-conductor, and a protection layer provided above the at least one of the top surface and the bottom surface to cover the outer-surface conductor.

According to the above embodiment, the protection layer covers the outer-surface conductor, so as to be capable of protecting the outer-surface conductor. Furthermore, the protection layer covers at least one of the top surface and the bottom surface of the main body of the glass substrate, so as to be capable of protecting the main body.

Preferably, in the electronic component according to an embodiment, at least a center of the first side surface is provided with the colored insulation layer.

According to the above embodiment, when the electronic component is to be detected from the first side surface of the main body of the glass substrate by using the detector, such as a laser sensor or a camera, if the center of the first side surface is set as the detection target, the electronic component can be detected more readily since at least the center of the first side surface is provided with the colored insulation layer.

Preferably, in the electronic component according to an embodiment, the glass substrate has two of the protrusions arranged in the second direction at the first side surface, and at least a portion of the colored insulation layer is disposed between the two protrusions and is adjacent to each of the two protrusions in the second direction.

According to the above embodiment, since the two protrusions sandwich the colored insulation layer, delamination of the colored insulation layer can be suppressed.

Preferably, in the electronic component according to an embodiment, at the first side surface, a width of the colored insulation layer in the second direction is larger than a width of the protrusion in the second direction.

In this case, the width refers to a maximum width. In detail, the width refers to a maximum value of a second-direction width in the first direction.

According to the above embodiment, since the colored insulation layer on the first side surface can be made larger than the protrusion, the electronic component can be detected more readily by the detector, and the mechanical strength of the electronic component can be further increased.

Preferably, in the electronic component according to an embodiment, as viewed from the direction orthogonal to the first side surface, the through-conductor includes two through-conductors neighboring each other in the second direction, the protrusion overlaps one of the two neighboring through-conductors, and the colored insulation layer overlaps a region between the two neighboring through-conductors.

According to the above embodiment, since the region of the first side surface near between the two neighboring through-conductors is provided with the colored insulation layer having relatively low permittivity, the possibility of an occurrence of stray capacitance can be reduced near the two neighboring through-conductors.

Preferably, in the electronic component according to an embodiment, the protrusion is crystallized.

According to the above embodiment, since the transparency of the protrusion is lower than the transparency of the main body, the electronic component can be detected more readily.

Preferably, a manufacturing method of an electronic component according to an embodiment includes a step for preparing a motherboard composed of photosensitive glass and including a first principal surface and a second principal surface; a step for irradiating a portion of a cutting region of the first principal surface with ultraviolet light and subsequently crystallizing the portion of the cutting region by heating; and a step for forming a through-hole and a bridge portion, the step including removing the crystallized portion of the cutting region by etching to form the through-hole extending through the first principal surface and the second principal surface of the motherboard and to form the bridge portion extending from the first principal surface to the second principal surface of the motherboard in an area of the cutting region excluding an area provided with the through-hole. The method further includes a step for forming a through-conductor extending through the first principal surface and the second principal surface of the motherboard; a step for embedding a colored insulation layer in the through-hole and bringing the colored insulation layer into contact with the bridge portion; and a step for splitting the motherboard into a plurality of electronic components by cutting the colored insulation layer and the bridge portion along the cutting region.

According to the above embodiment, the through-hole is provided in a portion of the cutting region, the colored insulation layer is embedded in the through-hole, and the motherboard is split by cutting the colored insulation layer along the cutting region, so that the side surfaces of the split electronic component can be partially covered with the colored insulation layer.

Furthermore, since the bridge portion is in contact with the colored insulation layer, the bridge portion is fixed to the colored insulation layer, thereby reducing the possibility of chipping and cracking of the bridge portion during the cutting process of the colored insulation layer and the bridge portion.

Moreover, since the colored insulation layer is provided in the state of the motherboard, a simple and low-cost process can be achieved, as compared with a case where the colored insulation layer is applied to each component after the splitting process of the motherboard. In contrast, if the colored insulation layer is to be applied to each split component, the time and effort and the cost required for the work increase.

Preferably, in the manufacturing method of the electronic component according to an embodiment, the step for forming the through-hole and the bridge portion includes forming the through-hole at least in an area of the cutting region corresponding to a corner of the electronic component.

According to the above embodiment, since the corner of the electronic component can be provided with the colored insulation layer, chipping and cracking of the corner can be suppressed.

Preferably, the manufacturing method of the electronic component according to an embodiment further includes a step for forming an outer-surface conductor electrically connected to the through-conductor above at least one of the first principal surface and the second principal surface; and a step for forming a protection layer above the at least one of the first principal surface and the second principal surface to cover the outer-surface conductor. The step for forming the outer-surface conductor and the step for forming the protection layer are performed prior to the step for splitting the motherboard into the plurality of electronic components.

According to the above embodiment, the protection layer covers the outer-surface conductor, so as to be capable of protecting the outer-surface conductor. Moreover, the protection layer covers at least one of the top surface and the bottom surface of the main body, so as to be capable of protecting the main body.

Preferably, in the manufacturing method of the electronic component according to an embodiment, the step for forming the protection layer includes forming the protection layer without overlapping the cutting region, as viewed from a direction orthogonal to the first principal surface of the motherboard.

According to the above embodiment, when the motherboard is to be split by, for example, dicing, contact of a dicing blade with the protection layer can be suppressed. As a result, delamination of the protection layer from the motherboard can be suppressed.

Preferably, the manufacturing method of the electronic component according to an embodiment further includes a step for irradiating the bridge portion with ultraviolet light and subsequently crystallizing the bridge portion by heating, after the step for forming the through-hole and the bridge portion.

According to the above embodiment, the bridge portion is crystallized, and the splitting process of the motherboard is performed by cutting the bridge portion, so that the side surfaces of each split electronic component can be provided with the protrusion. Moreover, since the bridge portion is crystallized, chipping and cracking of the bridge portion can be suppressed during the splitting process of the motherboard.

The electronic component and the manufacturing method thereof according to aspects of the present disclosure facilitate detection by a detector, such as a laser sensor or a camera.

DETAILED DESCRIPTION

Figure 1:
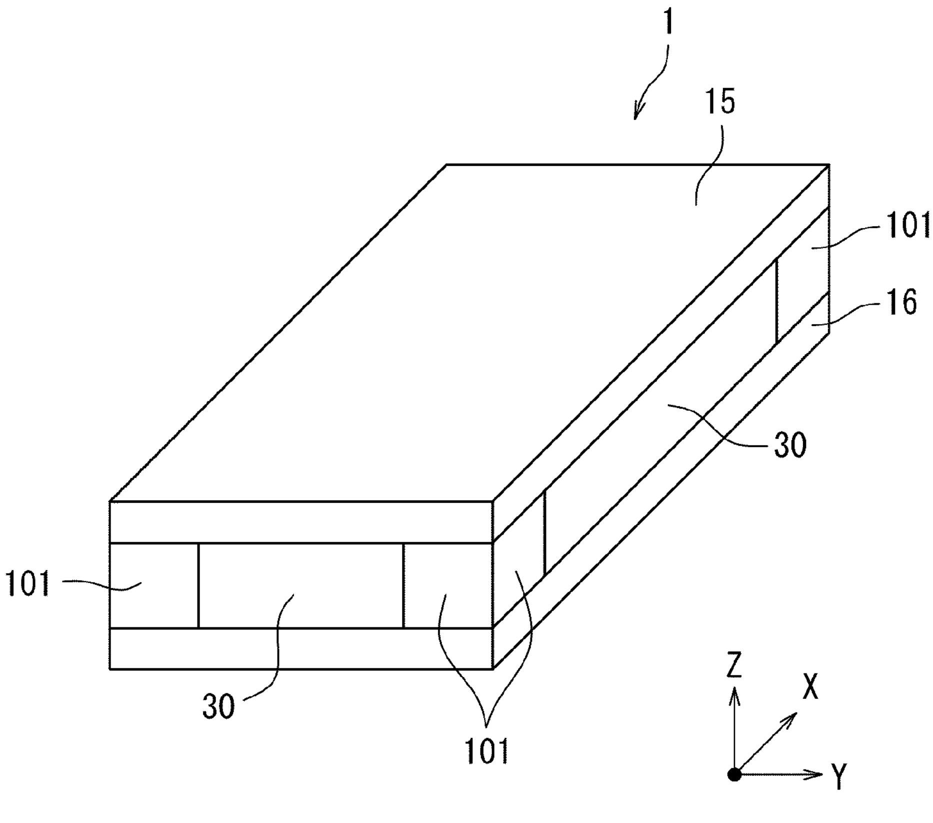
FIG. 1 is a perspective view illustrating an inductor component as an electronic component according to a first embodiment.

An electronic component and a manufacturing method thereof according to aspects of the present disclosure will be described in more detail below with reference to embodiments shown in the drawings. The drawings partially include schematic drawings and sometimes do not reflect the actual dimensions or scales.

First Embodiment

Configuration

Figure 2:
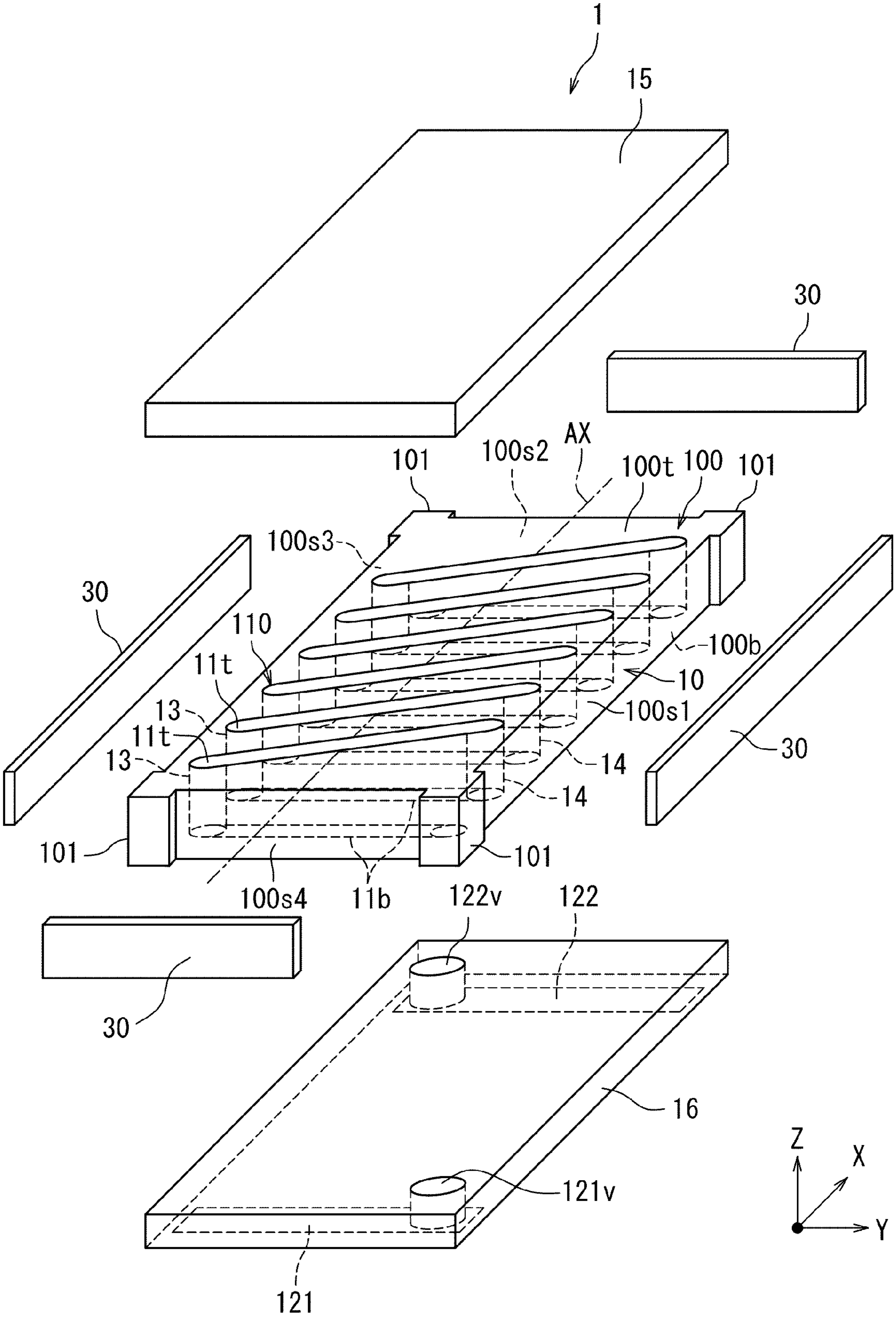
FIG. 2 is an exploded perspective view of the inductor component.
Figure 3:
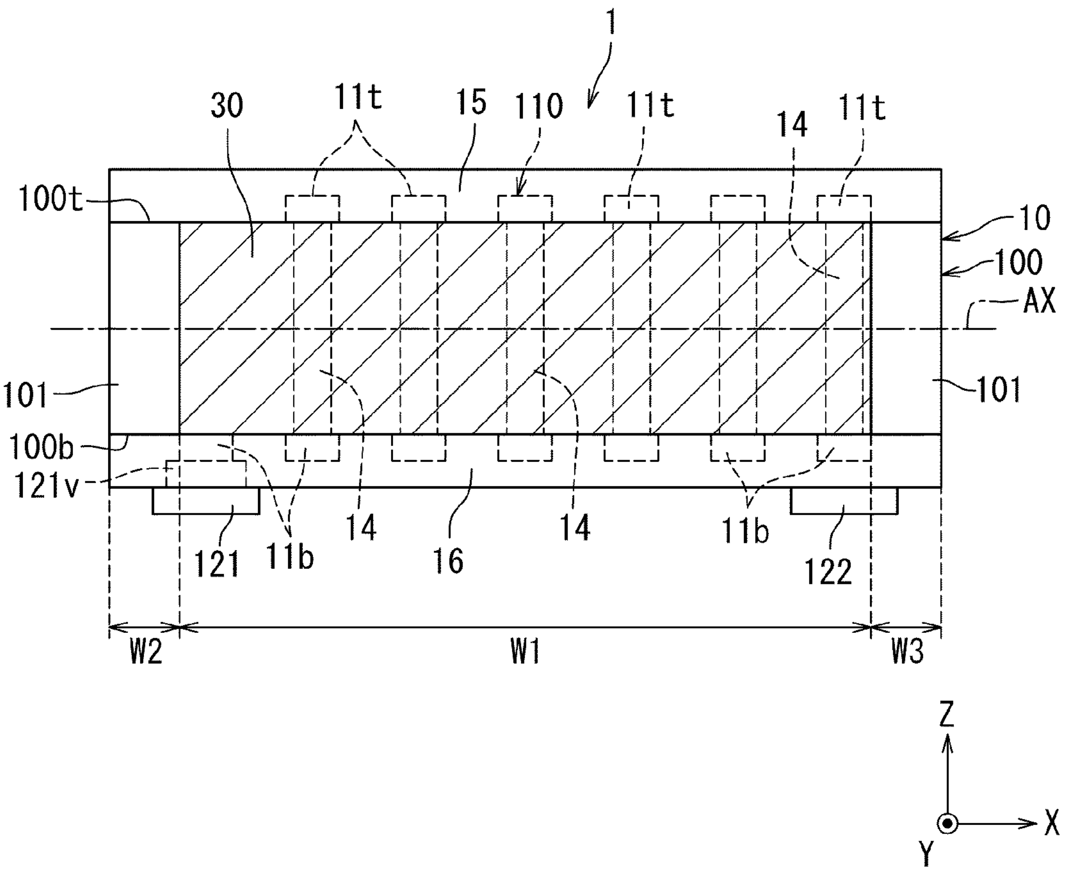
FIG. 3 is a side view of the inductor component, as viewed from a first side surface thereof.
Figure 4A:
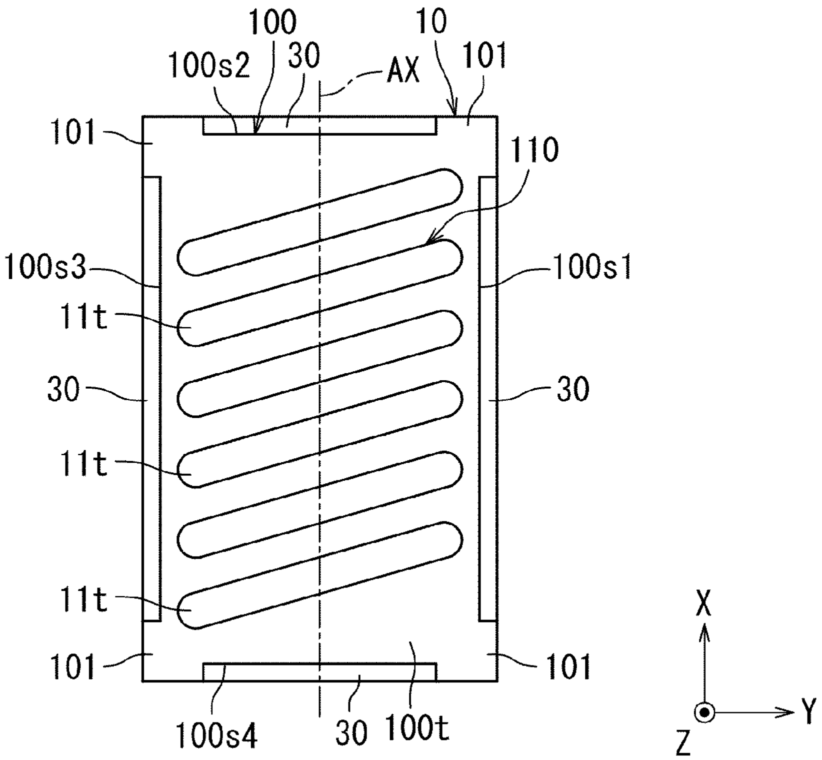
FIG. 4A is a top view of a coil of the inductor component, as viewed from a top surface thereof.
Figure 4B:
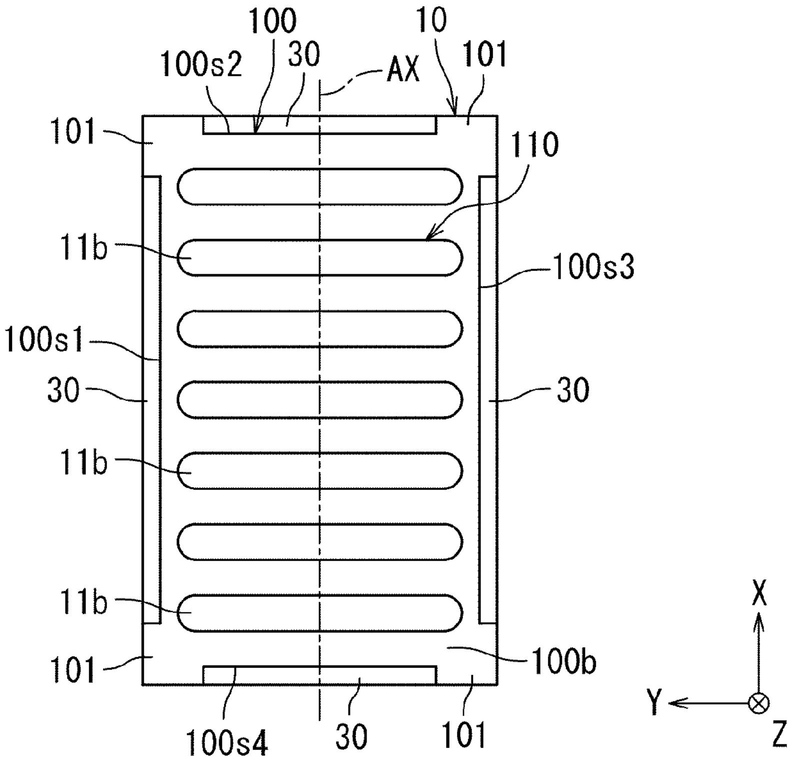
FIG. 4B is a bottom view of the coil of the inductor component, as viewed from a bottom surface thereof.

In a first embodiment, an electronic component according to the present disclosure is described as being an inductor component as an example. FIG. 1 is a perspective view of the inductor component, as viewed from a top surface thereof. FIG. 2 is an exploded perspective view of the inductor component, as viewed from the top surface thereof. FIG. 3 is a side view of the inductor component, as viewed from a first side surface thereof. FIG. 4A is a top view of a coil of the inductor component, as viewed from the top surface thereof. FIG. 4B is a bottom view of the coil of the inductor component, as viewed from a bottom surface thereof. In FIG. 3, a position where a colored insulation layer exists is hatched for the sake of convenience.

An inductor component 1 is, for example, a surface-mounted inductor component used in a high-frequency-signal transmission circuit. As shown in FIGS. 1, 2, 3, 4A, and 4B, the inductor component 1 includes a glass substrate 10, a coil 110 provided in the glass substrate 10, a first protection layer 15 provided on the top surface of the glass substrate 10 and covering a portion of the coil 110, a second protection layer 16 provided on the bottom surface of the glass substrate 10 and covering a portion of the coil 110, a colored insulation layer 30 provided on the side surfaces of the glass substrate 10, and a first terminal electrode 121 and a second terminal electrode 122 that are provided on the second protection layer 16 and that are electrically connected to the coil 110.

The glass substrate 10 has a main body 100 and protrusions 101 protruding from the main body 100. The main body 100 has high transparency. The main body 100 is a rectangular parallelepiped having a length, a width, and a height. The main body 100 has a first side surface **100*s*1 and a third side surface 100*s*3 that are located at opposite ends in the width direction, a second side surface 100*s*2 and a fourth side surface 100*s*4 that are located at opposite ends in the length direction, and a bottom surface 100*b* and a top surface 100*t* that are located at opposite ends in the height direction. In other words, the outer surfaces of the main body 100 include the first side surface 100*s*1 and the second side surface 100*s*2, the third side surface 100*s*3 and the fourth side surface 100*s*4, and the bottom surface 100*b* and the top surface 100*t*. The bottom surface 100*b* faces a mount substrate when the inductor component 1** is mounted to the mount substrate.

As shown in the drawings, a direction corresponding to the length direction (longitudinal direction) of the main body 100 and extending from the fourth side surface **100*s*4 toward the second side surface 100*s*2 is defined as an X direction for the sake of convenience. A direction corresponding to the width direction of the main body 100 and extending from the third side surface 100*s*3 toward the first side surface 100*s*1 is defined as a Y direction. A direction corresponding to the height direction of the main body 100 and extending from the bottom surface 100*b* toward the top surface 100*t*** is defined as a Z direction. The X direction, the Y direction, and the Z direction are orthogonal to one another and constitute a left-handed system when arranged in the following order: X, Y, and Z.

In this description, the outer surfaces of the main body 100 do not simply imply that the outer surfaces are oriented toward the outer periphery of the main body 100, but serve as boundaries between the outside and the inside of the main body 100. Furthermore, the expression "above an outer surface (top surface, bottom surface, or side surface) of the main body 100" does not refer to one absolute direction, as in orthogonally above, defined by the gravitational direction, but refers to an outward-extending direction, of the outside and the inside separated from each other by the outer surface serving as a boundary, with reference to the outer surface. Therefore, the expression "above an outer surface" refers to a relative direction defined in accordance with the orientation of the outer surface. Moreover, the expression "above" relative to a certain element includes not only a position above and distant from the element, that is, a position above the element with another object interposed therebetween or a position above the element with a distance therebetween, but also a position directly on and in contact with the element.

The glass substrate 10 has insulation properties. The glass substrate 10 is preferably, for example, a photosensitive glass substrate represented by Foturan II (registered trademark of Schott AG). In particular, the glass substrate 10 preferably contains a cerium oxide (ceria: $CeO_2$). In this case, the cerium oxide acts as a sensitizer to facilitate a photolithography-based process.

However, since the glass substrate 10 can be processed by machining, such as drilling or sandblasting, by dry/wet etching using a photoresist, a metal mask, and so on, or by laser processing, the glass substrate 10 may be a glass substrate not having photosensitivity. The glass substrate 10 may be formed by sintering a glass paste, or may be formed by using a known technique, such as a float process.

The protrusions 101 protrude from portions of the side surfaces of the main body 100 of the glass substrate 10. In detail, the protrusions 101 protrude outward from the main body 100 from a portion of the first side surface **100*s*1, a portion of the second side surface 100*s*2, a portion of the third side surface 100*s*3, and a portion of the fourth side surface 100*s*4**.

As viewed from a direction orthogonal to the first side surface **100*s*1, the protrusions 101 extend in the Z direction (corresponding to an example of a "first direction" defined in the claims) that is orthogonal to the top surface 100*t*. The opposite ends of the first side surface 100*s*1 in the X direction are individually provided with the respective protrusions 101. In other words, the first side surface 100*s*1 is provided with two protrusions 101** respectively at the opposite ends in the X direction.

Likewise, as viewed from a direction orthogonal to the second side surface **100*s*2, the protrusions 101 extend in the Z direction that is orthogonal to the top surface 100*t*. The opposite ends of the second side surface 100*s*2 in the Y direction are individually provided with the respective protrusions 101. As viewed from a direction orthogonal to the third side surface 100*s*3, the protrusions 101 extend in the Z direction that is orthogonal to the top surface 100*t*. The opposite ends of the third side surface 100*s*3 in the X direction are individually provided with the respective protrusions 101. As viewed from a direction orthogonal to the fourth side surface 100*s*4, the protrusions 101 extend in the Z direction that is orthogonal to the top surface 100*t*. The opposite ends of the fourth side surface 100*s*4 in the Y direction are individually provided with the respective protrusions 101**.

At least one side surface of the first side surface **100*s*1 to the fourth side surface 100*s*4 may be provided with the protrusions 101. In this case, the at least one side surface corresponds to an example of a "first side surface" defined in the claims. As an alternative to this embodiment in which each side surface, such as the first side surface 100*s*1, is provided with two protrusions 101, each side surface may be provided with one protrusion 101 or three or more protrusions 101**.

Furthermore, although each side surface, such as the first side surface **100*s*1, has the protrusions 101 extending continuously between the upper and lower ends in the Z direction, the protrusions 101 may exist partially in the Z direction (up-down direction). In other words, the length of each protrusion 101 in the Z direction may be smaller than the length between the upper and lower ends of the first side surface 100*s*1**.

Furthermore, as viewed from a direction orthogonal to each side surface, such as the first side surface **100*s*1, the extending direction of the protrusions 101 is completely aligned with the Z direction. Alternatively, the extending direction of the protrusions 101 may be substantially aligned with the Z direction. For example, an inclination angle formed between the extending direction of each protrusion 101** and the Z direction may be 10° or smaller.

Furthermore, although each side surface, such as the first side surface **100*s*1, is provided with the protrusions 101 at the opposite ends of the first side surface 100*s*1 in the X direction, the protrusions 101 do not have to be provided at the opposite ends. For example, as viewed from the direction orthogonal to the first side surface 100*s*1, the protrusions 101 may be provided away from the second side surface 100*s*2 and the fourth side surface 100*s*4. Specifically, the first side surface 100*s*1 may be provided with the protrusions 101** toward the center relative to the opposite ends in the X direction.

As an alternative to being a rectangular parallelepiped, the main body 100 may be a circular cylinder. In this case, the peripheral surface of the circular cylinder corresponds to an example of a "first side surface" defined in the claims. A portion of the peripheral surface of the circular cylinder is provided with a protrusion 101.

The coil 110 is helically wound along an axis AX. The axis AX of the coil 110 is disposed parallel to the bottom surface 100*b*. The coil 110 includes a plurality of bottom-surface conductors 11*b*, a plurality of top-surface conductors 11*t*, a plurality of first through-conductors 13, and a plurality of second through-conductors 14. The bottom-surface conductors 11*b* and the top-surface conductors 11*t* each correspond to an example of an "outer-surface conductor" defined in the claims.

The plurality of bottom-surface conductors 11*b* are disposed above the bottom surface 100*b*. The plurality of bottom-surface conductors 11*b* are arranged in contact with the bottom surface 100*b* along the axis AX. The plurality of top-surface conductors 11*t* are disposed above the top surface 100*t*. The plurality of top-surface conductors 11*t* are arranged in contact with the top surface 100*t* along the axis AX.

The plurality of first through-conductors 13 are provided within the main body 100 and extend through the bottom surface 100*b* and the top surface 100*t*. The plurality of first through-conductors 13 extend from the bottom-surface conductors 11*b* toward the top-surface conductors 11*t* and are arranged along the axis AX.

The plurality of second through-conductors 14 are provided within the main body 100 and extend through the bottom surface 100*b* and the top surface 100*t*. The plurality of second through-conductors 14 extend from the bottom-surface conductors 11*b* toward the top-surface conductors 11*t* and are arranged along the axis AX. The second through-conductors 14 are provided opposite the first through-conductors 13 relative to the axis AX. The bottom-surface conductors 11*b*, the first through-conductors 13, the top-surface conductors 11*t*, and the second through-conductors 14 are electrically connected in this order, and constitute at least a portion of the helical coil 110.

The top-surface conductors 11*t* extend in the Y direction while being slightly inclined in the X direction. The top-surface conductors 11*t* are all disposed parallel to each other in the X direction. The bottom-surface conductors 11*b* extend in the Y direction. The bottom-surface conductors 11*b* are all disposed parallel to each other in the X direction.

The first through-conductors 13 are disposed toward the third side surface 100*s*3 relative to the axis AX within through-holes in the main body 100. The second through-conductors 14 are disposed toward the first side surface 100*s*1 relative to the axis AX within through-holes in the main body 100. The first through-conductors 13 and the second through-conductors 14 extend in a direction orthogonal to the bottom surface 100*b* and the top surface 100*t*. All the first through-conductors 13 and all the second through-conductors 14 are disposed parallel to each other in the X direction.

The bottom-surface conductors 11*b* and the top-surface conductors 11*t* are composed of a conductive material, such as copper, silver, gold, or an alloy thereof. The bottom-surface conductors 11*b* and the top-surface conductors 11*t* may each be a metallic film formed by, for example, plating, deposition, or sputtering, or may each be a metal sintered body formed by applying and sintering a conductive paste. The material of the first through-conductors 13 and the second through-conductors 14 is the same as the material of the bottom-surface conductors 11*b* and the top-surface conductors 11*t*.

The bottom-surface conductors 11*b* and the top-surface conductors 11*t* are preferably formed by a semi-additive process, so that low-electrical-resistance, high-precision, and high-aspect bottom-surface conductors 11*b* and top-surface conductors 11*t* can be formed. The first through-conductors 13 and the second through-conductors 14 can be formed within through-holes preliminarily formed in the main body 100 by using the same material and the same manufacturing method used for the bottom-surface conductors 11*b* and the top-surface conductors 11*t*.

The first protection layer 15 is disposed above the top surface 100*t* to cover the top-surface conductors 11*t*. The first protection layer 15 is in contact with the top surface 100*t*, the top-surface conductors 11*t*, and the colored insulation layer 30. The first protection layer 15 covers the top-surface conductors 11*t* so as to protect the top-surface conductors 11*t* from an external force and to prevent the top-surface conductors 11*t* from being damaged. Furthermore, because the first protection layer 15 covers the top surface 100*t* of the main body 100, the first protection layer 15 can protect the main body 100. Moreover, because the first protection layer 15 is in contact with the colored insulation layer 30, the colored insulation layer 30 is fixed to the first protection layer 15, thereby suppressing delamination of the colored insulation layer 30 during a splitting process into individual inductor components 1.

The second protection layer 16 is disposed above the bottom surface 100*b* to cover the bottom-surface conductors 11*b*. The second protection layer 16 is in contact with the bottom surface 100*b*, the bottom-surface conductors 11*b*, and the colored insulation layer 30. The second protection layer 16 covers the bottom-surface conductors 11*b* so as to protect the bottom-surface conductors 11*b* from an external force and to prevent the bottom-surface conductors 11*b* from being damaged. Furthermore, because the second protection layer 16 covers the bottom surface 100*b* of the main body 100, the second protection layer 16 can protect the main body 100. Moreover, because the second protection layer 16 is in contact with the colored insulation layer 30, the colored insulation layer 30 is fixed to the second protection layer 16, thereby suppressing delamination of the colored insulation layer 30 during the splitting process into individual inductor components 1.

The first protection layer 15 and the second protection layer 16 have insulation properties and are each composed of, for example, resin, such as epoxy or polyimide.

The first terminal electrode 121 is disposed above the bottom surface 100*b* and is connected to a first end of the coil 110. The second terminal electrode 122 is disposed above the bottom surface 100*b* and is connected to a second end of the coil 110. The first terminal electrode 121 is provided on the second protection layer 16 toward the fourth side surface 100*s*4 relative to the center of the glass substrate 10 in the X direction. The second terminal electrode 122 is provided on the second protection layer 16 toward the second side surface 100*s*2 relative to the center of the glass substrate 10 in the X direction.

The first terminal electrode 121 is connected to the bottom-surface conductors 11*b* by a first via conductor 121*v* embedded in the second protection layer 16. The second terminal electrode 122 is connected to the bottom-surface conductors 11*b* by a second via conductor 122*v* embedded in the second protection layer 16.

The first terminal electrode 121 has a foundation layer and a plating layer covering the foundation layer. The foundation layer contains a conductive material, such as Ag or Cu. The plated layer contains a conductive material, such as Ni, Sn, Pd, or Au. Likewise, the second terminal electrode 122 has a foundation layer and a plating layer covering the foundation layer. The first terminal electrode 121 and the second terminal electrode 122 may be composed of a single-layer conductor material.

The colored insulation layer 30 is provided on a portion of the first side surface **100*s*1, a portion of the second side surface 100*s*2, a portion of the third side surface 100*s*3, and a portion of the fourth side surface 100*s*4 of the main body 100. In detail, the colored insulation layer 30 is provided in an area where the first side surface 100*s*1 is not provided with the protrusions 101, an area where the second side surface 100*s*2 is not provided with the protrusions 101, an area where the third side surface 100*s*3 is not provided with the protrusions 101, and an area where the fourth side surface 100*s*4 is not provided with the protrusions 101**.

More specifically, as viewed from the direction orthogonal to the first side surface **100*s*1, the colored insulation layer 30 extends in the Z direction (corresponding to an example of a "first direction" defined in the claims) that is orthogonal to the top surface 100*t* and is disposed adjacent to the protrusions 101 in the X direction (corresponding to an example of a "second direction" defined in the claims) that is orthogonal to the Z direction. In other words, the colored insulation layer 30 is in contact with the protrusions 101** in the Z direction.

Likewise, as viewed from the direction orthogonal to the second side surface **100*s*2, the colored insulation layer 30 extends in the Z direction that is orthogonal to the top surface 100*t* and is disposed adjacent to the protrusions 101 in the Y direction that is orthogonal to the Z direction. Moreover, as viewed from the direction orthogonal to the third side surface 100*s*3, the colored insulation layer 30 extends in the Z direction that is orthogonal to the top surface 100*t* and is disposed adjacent to the protrusions 101 in the X direction that is orthogonal to the Z direction. As viewed from the direction orthogonal to the fourth side surface 100*s*4, the colored insulation layer 30 extends in the Z direction that is orthogonal to the top surface 100*t* and is disposed adjacent to the protrusions 101** in the Y direction that is orthogonal to the Z direction.

The colored insulation layer 30 has insulation properties and is composed of, for example, resin, such as epoxy or polyimide. The colored insulation layer 30 has a color, such as green or blue, and the transparency of the colored insulation layer 30 is lower than the transparency of the main body 100.

At least one side surface of the first side surface **100*s*1 to the fourth side surface 100*s*4 may be provided with the colored insulation layer 30. In this case, the at least one side surface corresponds to an example of a "first side surface" defined in the claims. In other words, as viewed in a direction orthogonal to the first side surface, at least a portion of the colored insulation layer 30 extends in the first direction that is orthogonal to the top surface 100*t* and is disposed adjacent to the protrusions 101 in the second direction that is orthogonal to the first direction. Furthermore, the colored insulation layer 30 on each side surface, such as the first side surface 100*s*1**, may be split into a plurality of regions.

Furthermore, although each side surface, such as the first side surface **100*s*1, has the colored insulation layer 30 extending continuously between the upper and lower ends in the Z direction, the colored insulation layer 30 may extend partially in the Z direction (up-down direction). In other words, the length of the colored insulation layer 30 in the Z direction may be smaller than the length between the upper and lower ends of the first side surface 100*s*1**.

Furthermore, as viewed from the direction orthogonal to each side surface, such as the first side surface **100*s*1, the extending direction of the colored insulation layer 30 is completely aligned with the Z direction. Alternatively, the extending direction of the colored insulation layer 30 may be substantially aligned with the Z direction. For example, an inclination angle formed between the extending direction of the colored insulation layer 30** and the Z direction may be 10° or smaller.

Furthermore, at each side surface, such as the first side surface **100*s*1, the colored insulation layer 30 is in contact with both of the two protrusions 101 in the Z direction. Alternatively, the colored insulation layer 30 may be in contact with only one of the protrusions 101 in the Z direction. In other words, a portion of the area where the first side surface 100*s*1 is not provided with the protrusions 101 may be provided with the colored insulation layer 30. In this case, for example, in an area between the protrusion 101 not in contact with the colored insulation layer 30 and the colored insulation layer 30, the main body 100** may be exposed to the outside.

As an alternative to being a rectangular parallelepiped, the main body 100 may be a circular cylinder. In this case, the peripheral surface of the circular cylinder corresponds to an example of a "first side surface" defined in the claims. A portion of the peripheral surface of the circular cylinder is provided with the colored insulation layer 30.

According to the above configuration, the colored insulation layer 30 is provided on the first side surface **100*s*1 of the main body 100 of the glass substrate 10, so that when an electronic component is to be detected from the first side surface 100*s*1 of the main body 100 by using a detector, such as a laser sensor or a camera, the colored insulation layer 30 with low transparency can be readily recognized, whereby the inductor component 1** can be readily detected.

Furthermore, as viewed from the direction orthogonal to the first side surface **100*s*1, the colored insulation layer 30 extends in the Z direction. Thus, when the inductor component 1 is to be detected by scanning the detector in the Z direction, the colored insulation layer 30 can be readily recognized, whereby the inductor component 1** can be readily detected.

Moreover, because the colored insulation layer 30 is provided on the first side surface **100*s*1 of the main body 100 of the glass substrate 10, the exposed area of the main body 100 can be reduced, and the mechanical strength of the inductor component 1** against an external force can be increased.

The second side surface **100*s*2, the third side surface 100*s*3, and the fourth side surface 100*s*4 have advantages similar to the above-described advantages of the first side surface 100*s*1**.

Preferably, the area where the first side surface **100*s*1 is not provided with the protrusions 101 is entirely provided with the colored insulation layer 30. According to this configuration, the surface area of the colored insulation layer 30 on the first side surface 100*s*1 can be increased. Accordingly, the inductor component 1 can be detected more readily by the detector, and the mechanical strength of the inductor component 1 can be further increased. The second side surface 100*s*2, the third side surface 100*s*3, and the fourth side surface 100$s$4 have configurations and advantages similar to those of the first side surface 100$s$1**.

Preferably, at least one of the first protection layer 15 and the second protection layer 16 is colored, similar to the colored insulation layer 30. Accordingly, when the inductor component 1 is to be detected from the top surface 100$t$ or the bottom surface 100$b$ of the main body 100 by using the detector, such as a laser sensor or a camera, the protection layer 15 or 16 can be readily recognized, whereby the inductor component 1 can be readily detected.

Preferably, as shown in FIG. 3, at least the center of the first side surface 100$s$1 is provided with the colored insulation layer 30. According to this configuration, when the inductor component 1 is to be detected from the first side surface 100$s$1 of the main body 100 by using the detector, such as a laser sensor or a camera, if the center of the first side surface 100$s$1 is set as the detection target, the inductor component 1 can be detected more readily. The second side surface 100$s$2, the third side surface 100$s$3, and the fourth side surface 100$s$4 have configurations and advantages similar to those of the first side surface 100$s$1.

Preferably, as shown in FIG. 3, the first side surface 100$s$1 of the glass substrate 10 has two protrusions 101 arranged in the X direction, and at least a portion of the colored insulation layer 30 is disposed between the two protrusions 101 and is adjacent to the two protrusions 101 in the X direction. Accordingly, the two protrusions 101 sandwich the colored insulation layer 30 on the first side surface 100$s$1, so that delamination of the colored insulation layer 30 can be suppressed. If the first side surface 100$s$1 has three or more protrusions 101 arranged in the X direction, at least one set of sets each having two neighboring protrusions 101 may have at least a portion of the colored insulation layer 30 disposed between the two protrusions 101 and adjacent to the two protrusions 101 in the X direction. The second side surface 100$s$2, the third side surface 100$s$3, and the fourth side surface 100$s$4 have configurations and advantages similar to those of the first side surface 100$s$1.

Preferably, the width of the colored insulation layer 30 in the X direction on the first side surface 100$s$1 is larger than the width of each protrusion 101 in the X direction. In this case, the width is a maximum width. Specifically, the width is a maximum value of a second-direction (X-direction) width in the first direction (Z direction). In detail, as shown in FIG. 3, an X-direction width W1 of the colored insulation layer 30 is larger than the sum of an X-direction width W2 of the protrusion 101 located at the negative X-direction side and an X-direction width W3 of the protrusion 101 located at the positive X-direction side.

According to this configuration, since the colored insulation layer 30 on the first side surface 100$s$1 can be made larger than the protrusions 101, the inductor component 1 can be detected more readily by the detector, and the mechanical strength of the inductor component 1 can be further increased. The second side surface 100$s$2, the third side surface 100$s$3, and the fourth side surface 100$s$4 have configurations and advantages similar to those of the first side surface 100$s$1.

Manufacturing Method of Inductor Component 1

Figure 5A:
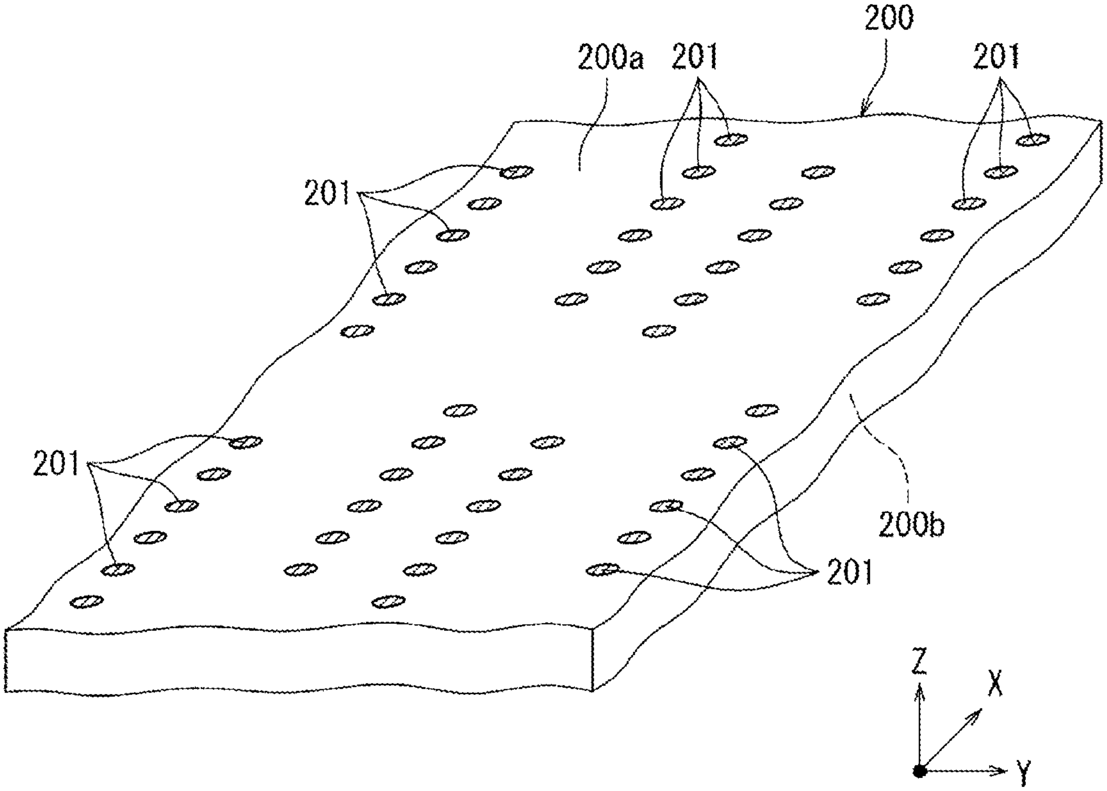
FIG. 5A is a perspective view explaining a manufacturing method of the inductor component.

As shown in FIG. 5A, a motherboard 200 composed of photosensitive glass and including a first principal surface 200$a$ and a second principal surface 200$b$ is prepared. The first principal surface 200$a$ corresponds to the top surface 100$t$, and the second principal surface 200$b$ corresponds to the bottom surface 100$b$. An example of the motherboard 200 that can be used is Foturan II. The motherboard 200 normally contains, for example, a silicon, lithium, aluminum, or cerium oxide so as to be adaptable to precise photolithography.

Through-conductor formation regions 201 on the first principal surface 200$a$ are irradiated with ultraviolet light. Subsequently, the motherboard 200 is crystallized by being heated (e.g., sintered), thereby forming crystallized portions extending from the first principal surface 200$a$ to the second principal surface 200$b$. The through-conductor formation regions 201 are regions where through-conductors are to be formed, and are hatched in FIG. 5A. In detail, the motherboard 200 is irradiated with ultraviolet light with a wavelength of about 310 nm. As a result of the ultraviolet irradiation, for example, metallic ions, such as cerium ions, in the photosensitive glass are oxidized by light energy, thereby releasing electrons. The processing depth to be ultimately obtained in the motherboard 200 can be controlled by adjusting the irradiation amount of the ultraviolet light in accordance with the thickness of the motherboard 200.

An exposure device used for the ultraviolet irradiation may be a contact aligner or a stepper from which ultraviolet light with a wavelength of about 310 nm can be obtained. Alternatively, a laser irradiation device, including a femtosecond laser, may be used as a light source. If a femtosecond laser is used, the laser light is collected inside the motherboard 200, so that electrons can be released from a metal oxide in the light collected area alone. Specifically, the surface of the laser-irradiated area of the motherboard 200 is not photosensitive, whereas the inside thereof alone is photosensitive.

Figure 5B:
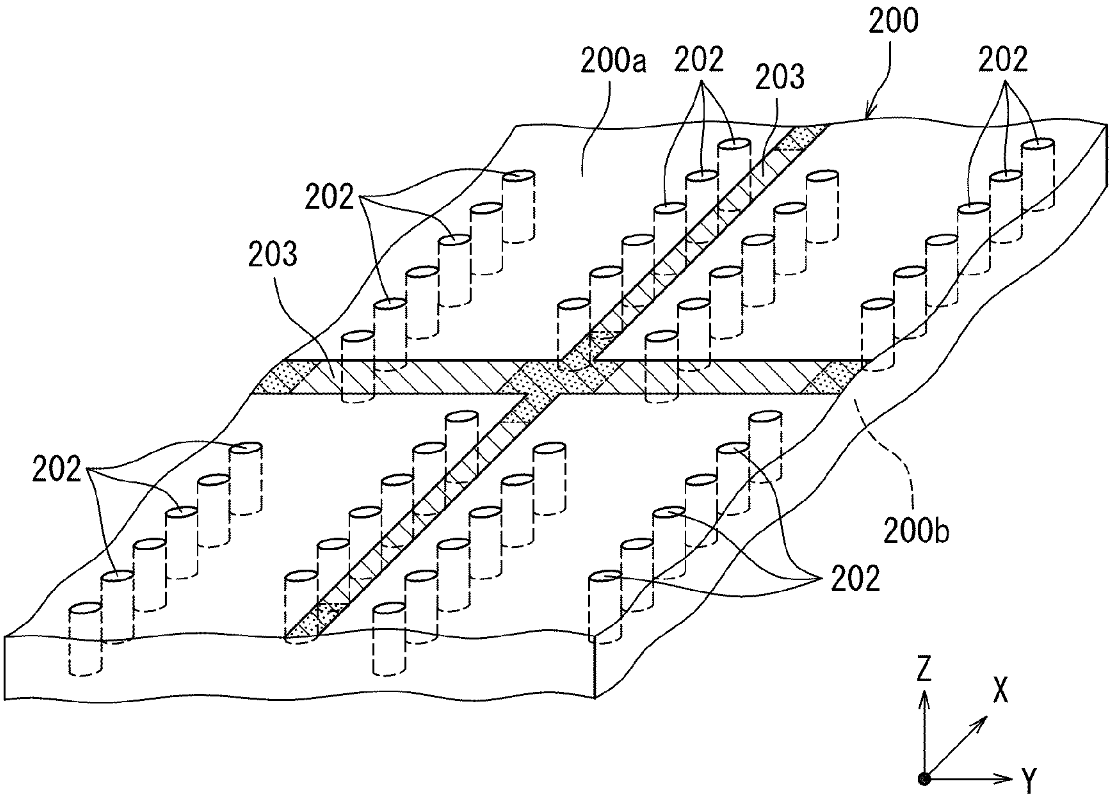
FIG. 5B is a perspective view explaining the manufacturing method of the inductor component.

As shown in FIG. 5B, in the through-conductor formation regions 201, the crystallized portions are removed by etching, thereby forming first through-holes 202 extending in the Z direction through the first principal surface 200$a$ and the second principal surface 200$b$. For example, a hydrofluoric acid solution is used for the etching. The concentration of the hydrofluoric acid solution preferably ranges between, for example, 5% and 10%. In the etching process, the motherboard 200 is entirely immersed in the hydrofluoric acid solution. Accordingly, only the crystallized portions in the board are etched, so that the first through-holes 202 are formed.

Subsequently, a cutting region 203 of the first principal surface 200$a$ is partially irradiated with ultraviolet light. Then, the motherboard 200 is crystallized by being heated (e.g., sintered), thereby forming a crystallized portion extending from the first principal surface 200$a$ to the second principal surface 200$b$. In detail, in the cutting region 203, areas excluding areas (i.e., dotted areas in FIG. 5B) where bridge portions, to be described later, are to be formed are irradiated with the ultraviolet light. Then, a heating process is performed to crystalize the areas irradiated with the ultraviolet light. The cutting region 203 is where second through-holes, to be described later, and the bridge portions are to be formed, and are diagonally hatched in FIG. 5B. The cutting region 203 is aligned with a cutting line to be used when the motherboard 200 is split into individual pieces.

Figure 5C:
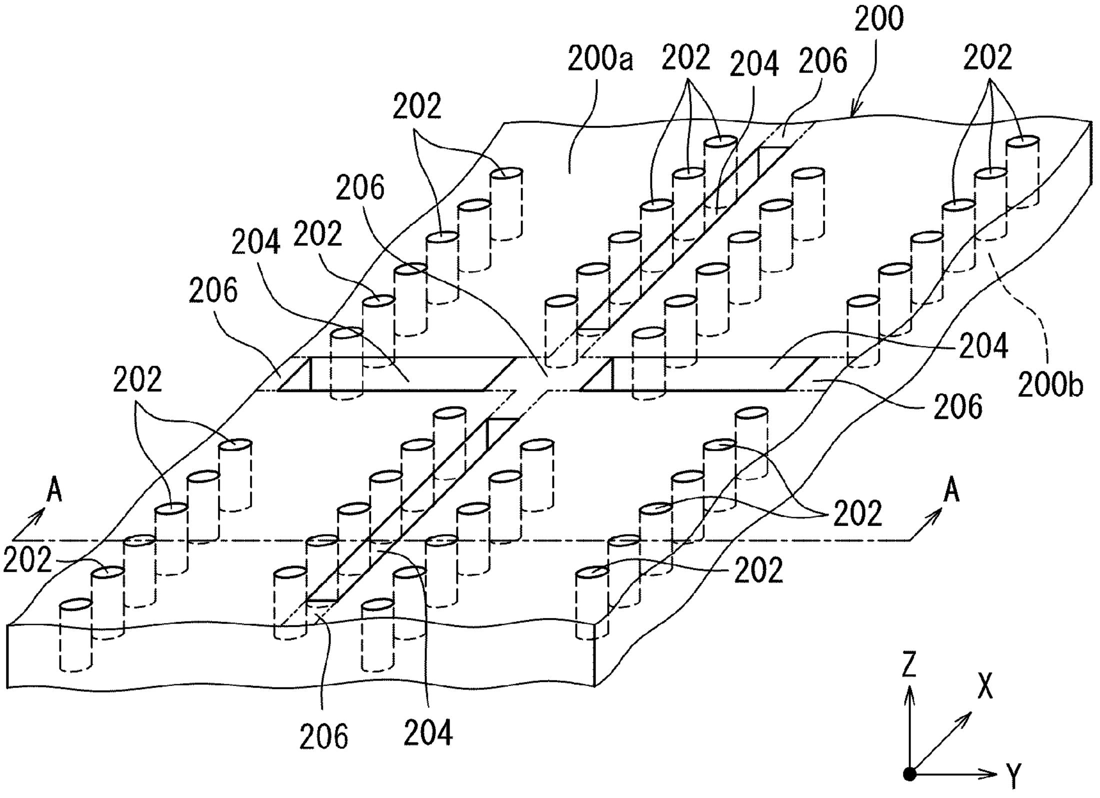
FIG. 5C is a perspective view explaining the manufacturing method of the inductor component.
Figure 5D:
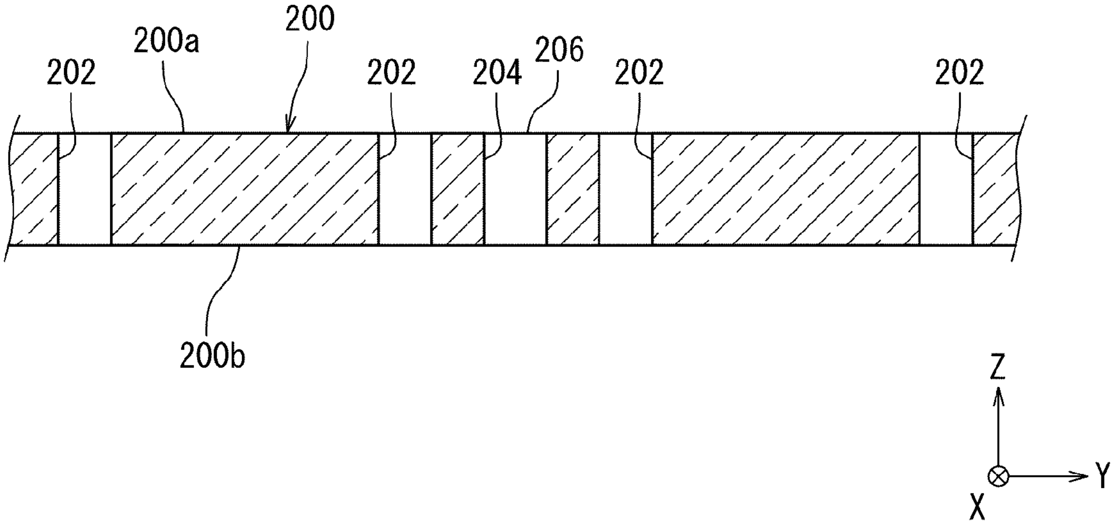
FIG. 5D is a cross-sectional view explaining the manufacturing method of the inductor component.

As shown in FIGS. 5C and 5D, in the cutting region 203, the crystallized portions are removed by being etched, thereby forming second through-holes 204 extending through the first principal surface 200$a$ and the second principal surface 200$b$ of the motherboard 200 and also forming bridge portions 206 extending from the first principal surface 200$a$ to the second principal surface 200$b$ in areas excluding the areas provided with the second through-holes 204. Specifically, the bridge portions 206 are areas remaining in the glass in the cutting region 203 after the etching process. The second through-holes 204 each correspond to an example of a "through-hole" defined in the claims. The bridge portions 206 are where individual inductor components to be manufactured are connected to each other. The bridge portions 206 are to be cut during the splitting process into the individual inductor components, and are to become the protrusions of the inductor components. FIG. 5D is a cross-sectional view taken along line A-A in FIG. 5C. In the motherboard 200, areas excluding the bridge portions 206 each correspond to the main body 100 in FIG. 2.

The through-conductor formation regions 201 and portions of the cutting region 203 may be crystallized simultaneously, and the crystallized portions may be etched simultaneously. Accordingly, the first through-holes 202 and the second through-holes 204 can be formed simultaneously.

Figure 5E:
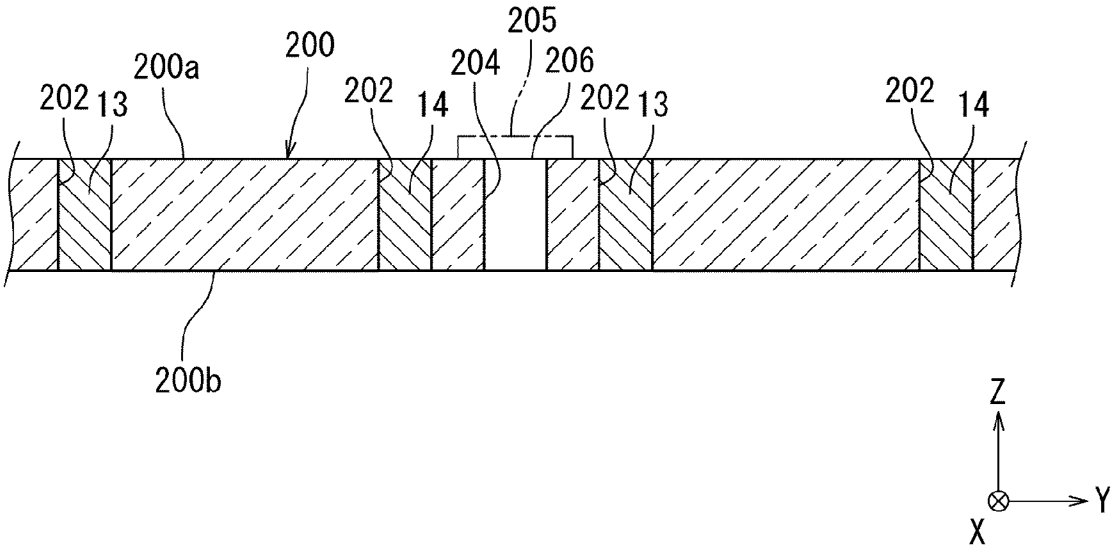
FIG. 5E is a cross-sectional view explaining the manufacturing method of the inductor component.

As shown in FIG. 5E, the through-conductors 13 and 14 extending through the first principal surface 200*a* and the second principal surface 200*b* of the motherboard 200 are formed. In detail, the first through-conductors 13 and the second through-conductors 14 are formed in the first through-holes 202 by, for example, a semi-additive process. In this case, a protection film 205 is formed over the first principal surface 200*a* of the motherboard 200 to cover the second through-holes 204, so that a plating material does not adhere to the second through-holes 204. In FIG. 5E, the protection film 205 is indicated with a double-dot chain line. The through-conductors 13 and 14 may be formed of a single seed layer, or may be formed in different processes.

Figure 5F:
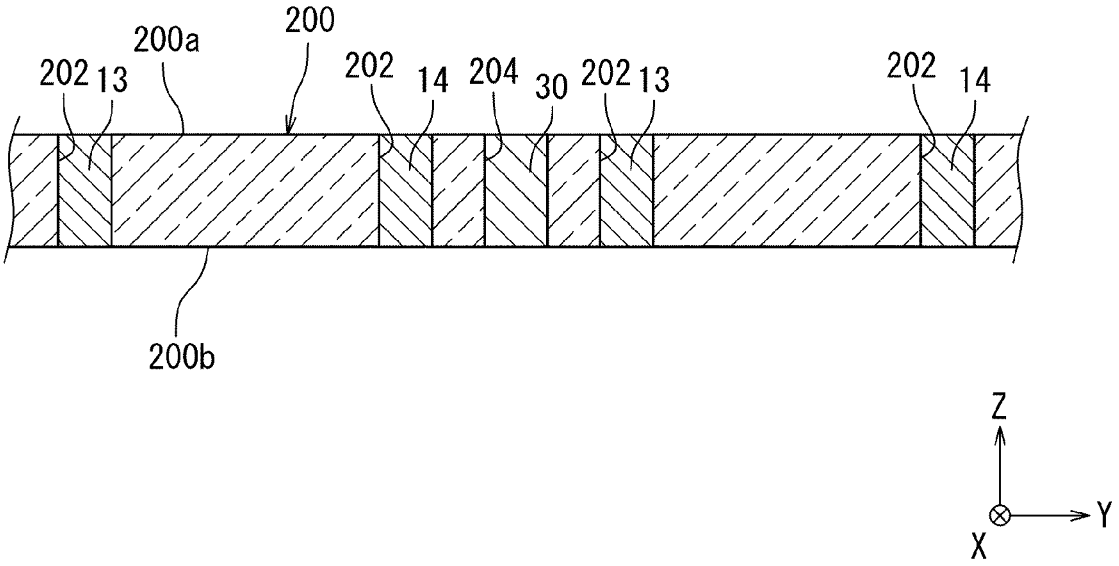
FIG. 5F is a cross-sectional view explaining the manufacturing method of the inductor component.

As shown in FIG. 5F, the colored insulation layer 30 is embedded in the second through-holes 204, and the colored insulation layer 30 is brought into contact with the bridge portions 206 (not shown). In detail, the colored insulation layer 30 is formed in the second through-holes 204 by, for example, spin coating. Alternatively, the colored insulation layer 30 may be provided over the first principal surface 200*a* while also being provided in the second through-holes 204, and the colored insulation layer 30 on the first principal surface 200*a* may be subsequently removed by, for example, grinding.

Figure 5G:
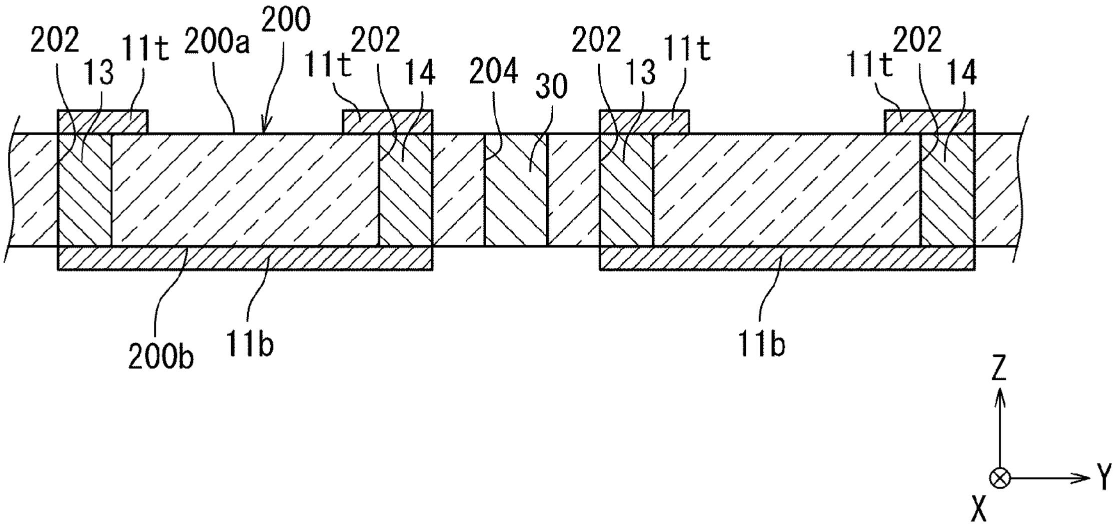
FIG. 5G is a cross-sectional view explaining the manufacturing method of the inductor component.

As shown in FIG. 5G, the top-surface conductors 11*t* electrically connected to the through-conductors 13 and 14 are formed on the first principal surface 200*a*, and the bottom-surface conductors 11*b* electrically connected to the through-conductors 13 and 14 are formed on the second principal surface 200*b*. For example, similar to the through-conductors 13 and 14, the top-surface conductors 11*t* and the bottom-surface conductors 11*b* are formed by a semi-additive process.

Figure 5H:
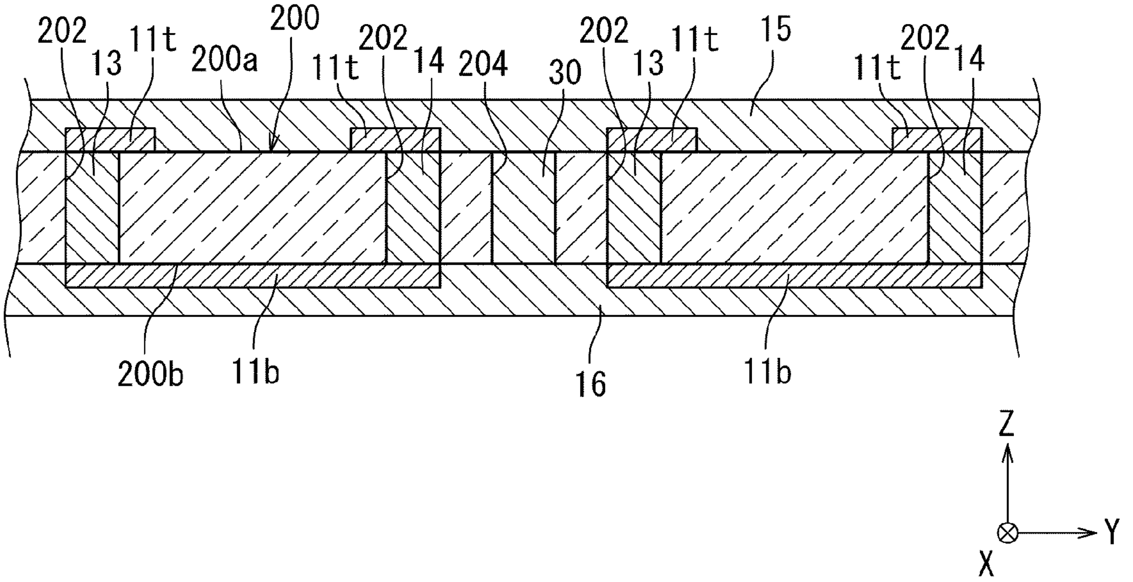
FIG. 5H is a cross-sectional view explaining the manufacturing method of the inductor component.

As shown in FIG. 5H, the first protection layer 15 is formed above the first principal surface 200*a* to cover the top-surface conductors 11*t*, and the second protection layer 16 is formed above the second principal surface 200*b* to cover the bottom-surface conductors 11*b*. In detail, the first protection layer 15 and the second protection layer 16 are each formed by laminating a resin film or by, for example, applying and thermally curing a resin paste.

Figure 5I:
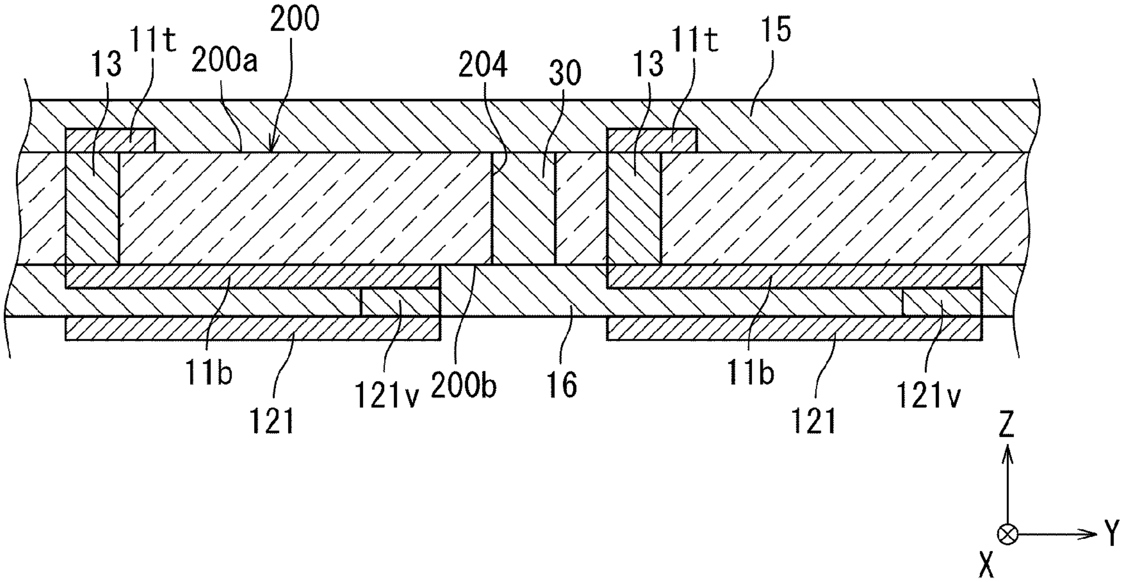
FIG. 5I is a cross-sectional view explaining the manufacturing method of the inductor component.

As shown in FIG. 5I, via holes are formed in the second protection layer 16. The first via conductor 121*v* is formed in each via hole. The first terminal electrodes 121 connecting to the first via conductors 121*v* are formed above the second protection layer 16. The first via conductors 121*v* and the first terminal electrodes 121 may be formed simultaneously or may be formed separately. The first via conductors 121*v* and the first terminal electrodes 121 are formed by, for example, a semi-additive process.

Figure 5J:
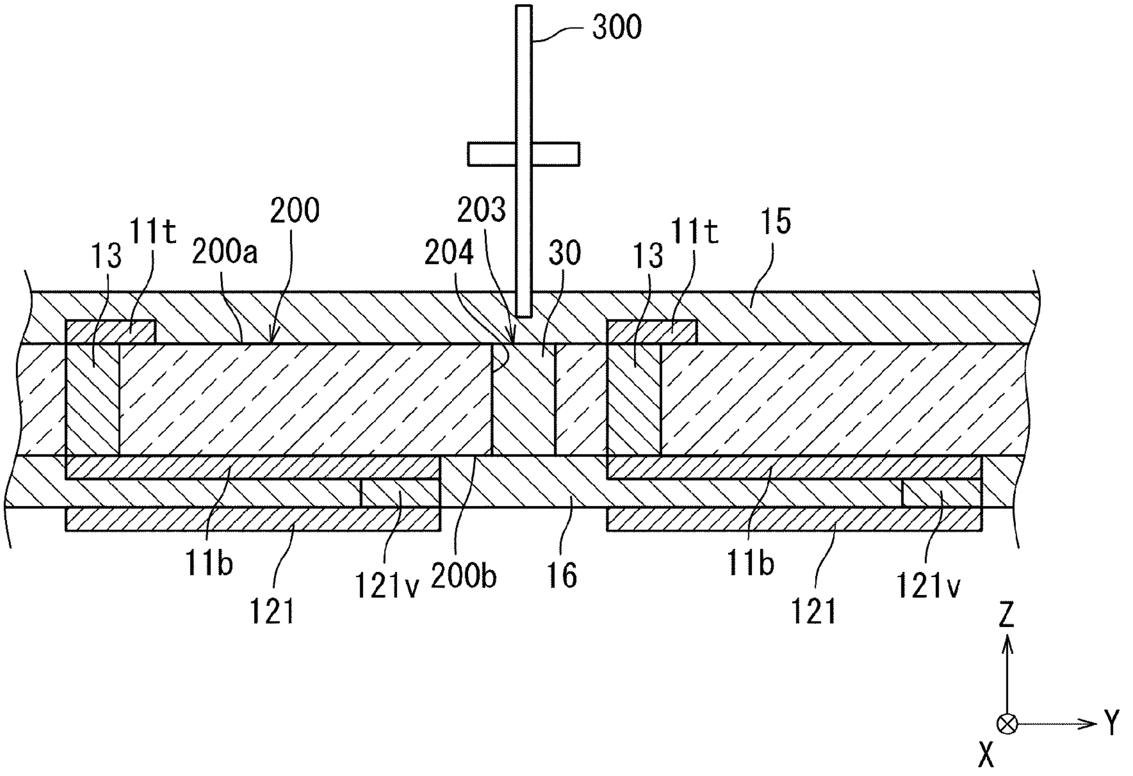
FIG. 5J is a cross-sectional view explaining the manufacturing method of the inductor component.
Figure 5K:
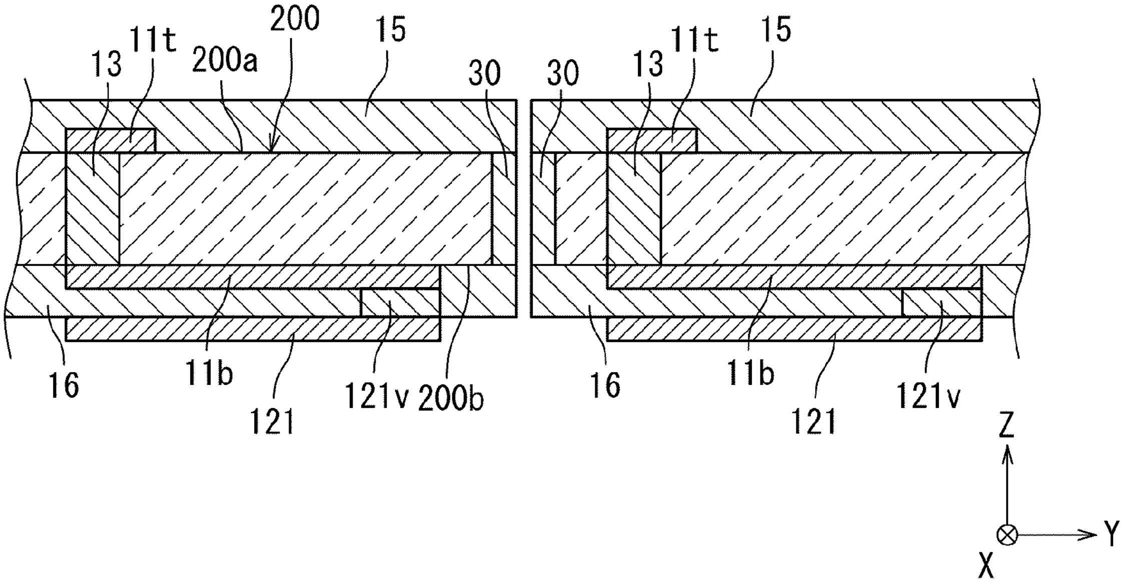
FIG. 5K is a cross-sectional view explaining the manufacturing method of the inductor component.

As shown in FIG. 5J, the colored insulation layer 30 and the bridge portions 206 (not shown) are cut along the cutting region 203. Thus, as shown in FIG. 5K, the motherboard 200 is split into a plurality of inductor components 1 shown in FIG. 1. In detail, a dicing blade 300 is moved along the cutting region 203 while being moved from the first protection layer 15 toward the second protection layer 16. Alternatively, a laser may be used for the cutting process in place of the dicing blade 300.

The above manufacturing method of the inductor component 1 includes a step for preparing the motherboard 200 composed of photosensitive glass and including the first principal surface 200*a* and the second principal surface 200*b*; a step for irradiating a portion of the cutting region 203 of the first principal surface 200*a* with ultraviolet light and subsequently crystallizing the portion of the cutting region 203 by heating; and a step for forming the second through-holes 204 and the bridge portions 206, the step including removing the crystallized portions of the cutting region 203 by etching to form the second through-holes 204 extending through the first principal surface 200*a* and the second principal surface 200*b* of the motherboard 200 and to form the bridge portions 206 extending from the first principal surface 200*a* to the second principal surface 200*b* of the motherboard 200 in areas of the cutting region 203 excluding areas provided with the second through-holes 204. The method further includes a step for forming the through-conductors 13 and 14 extending through the first principal surface 200*a* and the second principal surface 200*b* of the motherboard 200; a step for embedding the colored insulation layer 30 in the second through-holes 204 and bringing the colored insulation layer 30 into contact with the bridge portions 206; and a step for splitting the motherboard 200 into a plurality of inductor components 1 by cutting the colored insulation layer 30 and the bridge portions 206 along the cutting region 203.

According to the above manufacturing method, since the bridge portions 206 are in contact with the colored insulation layer 30, the bridge portions 206 are fixed to the colored insulation layer 30, thereby reducing the possibility of chipping and cracking of the bridge portions 206 during the cutting process of the colored insulation layer 30 and the bridge portions 206. As a result, the possibility of chipping and cracking of the protrusions 101 of each inductor component 1 can be reduced.

Furthermore, since the colored insulation layer 30 is provided in the state of the motherboard 200, a simple and low-cost process can be achieved, as compared with a case where the colored insulation layer 30 is applied to each component after the splitting process of the motherboard 200. In contrast, if the colored insulation layer 30 is to be applied to each component after the splitting process, the time and effort and the cost required for the work increase.

Preferably, prior to the step for splitting the motherboard 200 into the plurality of inductor components 1, the manufacturing method of the inductor component 1 further includes a step for forming the top-surface conductors 11*t* electrically connected to the through-conductors 13 and 14 above the first principal surface 200*a*; and a step for forming the first protection layer 15 above the first principal surface 200*a* to cover the top-surface conductors 11*t*.

According to the above preferred manufacturing method, the first protection layer 15 covers the top-surface conductors 11*t* so as to be capable of protecting the top-surface conductors 11*t*. Furthermore, the first protection layer 15 covers the top surface 100*t* of the main body 100 so as to be capable of protecting the main body 100. Likewise, the manufacturing method may further include a step for forming the bottom-surface conductors 11*b* and the second protection layer 16 above the second principal surface 200*b* of the motherboard 200.

Second Embodiment

Figure 6:
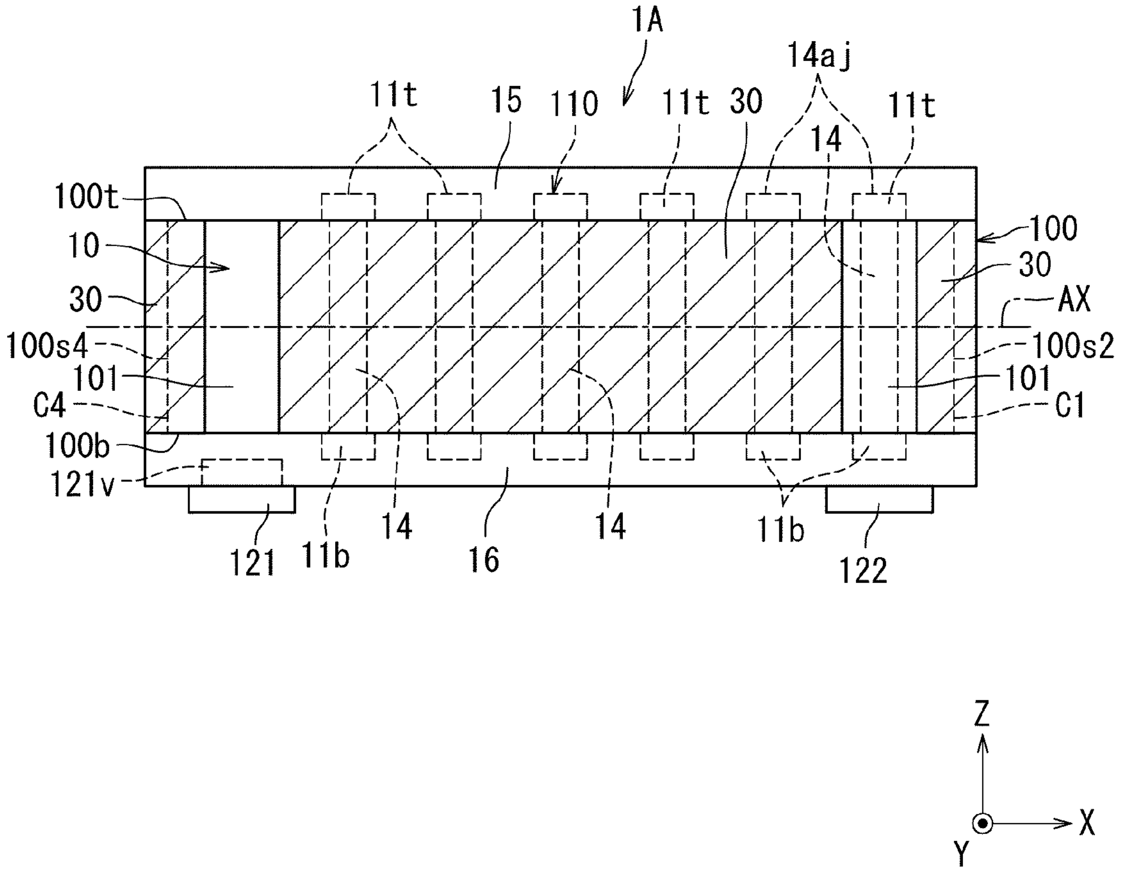
FIG. 6 is a side view of an inductor component as an electronic component according to a second embodiment, as viewed from the first side surface thereof.
Figure 7:
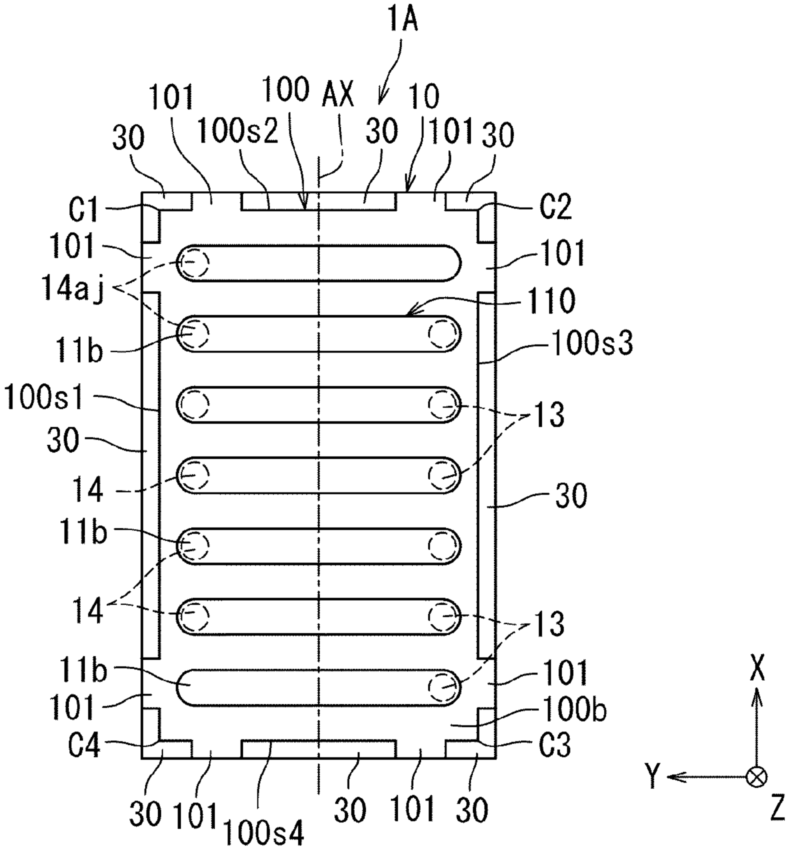
FIG. 7 is a bottom view of a coil of the inductor component, as viewed from the bottom surface thereof.

FIG. 6 is a side view of an inductor component as an electronic component according to a second embodiment, as viewed from the first side surface thereof. FIG. 7 is a bottom view of a coil of the inductor component, as viewed from the bottom surface thereof. FIG. 6 corresponds to FIG. 3, and FIG. 7 corresponds to FIG. 4B. In FIG. 6, a position where the colored insulation layer exists is hatched for the sake of convenience. The second embodiment is different from the first embodiment in terms of the positions of the protrusions. This difference will be described below. Other configurations are identical to those in the first embodiment, and descriptions thereof will be omitted.

As shown in FIGS. 6 and 7, the main body 100 includes the second side surface 100*s*2 and a first corner C1 between the first side surface 100*s*1 and the second side surface 100*s*2. The second side surface 100*s*2 connects the bottom surface 100*b* and the top surface 100*t* to each other and is adjacent to the first side surface 100*s*1 in the circumferential direction, as viewed from the direction (Z direction) orthogonal to the bottom surface 100*b*.

Likewise, the main body 100 includes the third side surface 100*s*3 and a second corner C2 between the second side surface 100*s*2 and the third side surface 100*s*3. The third side surface 100*s*3 connects the bottom surface 100*b* and the top surface 100*t* to each other and is adjacent to the second side surface 100*s*2 in the circumferential direction, as viewed from the direction orthogonal to the bottom surface 100*b*. Furthermore, the main body 100 includes the fourth side surface 100*s*4 and a third corner C3 between the third side surface 100*s*3 and the fourth side surface 100*s*4. The fourth side surface 100*s*4 connects the bottom surface 100*b* and the top surface 100*t* to each other and is adjacent to the third side surface 100*s*3 in the circumferential direction, as viewed from the direction orthogonal to the bottom surface 100*b*. Moreover, the main body 100 includes a fourth corner C4 between the fourth side surface 100*s*4 and the first side surface 100*s*1. In this embodiment, each of the first to fourth corners C1 to C4 is a ridge.

The colored insulation layer 30 is continuously provided on the first side surface 100*s*1, the first corner C1, and the second side surface 100*s*2. Likewise, the colored insulation layer 30 is continuously provided on the second side surface 100*s*2, the second corner C2, and the third side surface 100*s*3. Moreover, the colored insulation layer 30 is continuously provided on the third side surface 100*s*3, the third corner C3, and the fourth side surface 100*s*4. Furthermore, the colored insulation layer 30 is continuously provided on the fourth side surface 100*s*4, the fourth corner C4, and the first side surface 100*s*1.

As shown in FIG. 6, at the first side surface 100*s*1, the protrusion 101 located at the negative X-direction side is adjacent, in the X direction, to the colored insulation layer 30 provided at the fourth corner C4. The protrusion 101 located at the positive X-direction side is adjacent, in the X direction, to the colored insulation layer 30 provided at the first corner C1. The colored insulation layer 30 is also provided between the protrusion 101 located at the negative X-direction side and the protrusion 101 located at the positive X-direction side. In other words, at the first side surface 100*s*1, the colored insulation layer 30 and the protrusions 101 are arranged in the X direction in the following order: colored insulation layer 30, protrusion 101, colored insulation layer 30, protrusion 101, and colored insulation layer 30. The same applies to the second to fourth side surfaces 100*s*2 to 100*s*4.

According to the above configuration, since the colored insulation layer 30 is continuously provided on the first side surface 100*s*1, the first corner C1, and the second side surface 100*s*2, chipping and cracking can be suppressed at the first corner C1 where chipping and cracking tend to occur. The second corner C2, the third corner C3, and the fourth corner C4 each have an advantage similar to the above-described advantage of the first corner C1.

Preferably, as shown in FIG. 6, as viewed from a direction (Y direction) orthogonal to the first side surface 100*s*1, the second through-conductors 14 include two second through-conductors 14*aj* neighboring each other in the X direction. A protrusion 101 overlaps one of the two neighboring second through-conductors 14*aj*, and the colored insulation layer 30 overlaps a region between the two neighboring second through-conductors 14*aj*.

According to the above configuration, the region of the first side surface 100*s*1 near between the two neighboring second through-conductors 14*aj* is provided with the colored insulation layer 30 having relatively low permittivity, so that the possibility of an occurrence of stray capacitance can be reduced near the two neighboring second through-conductors 14*aj*. If the glass substrate 10 is, for example, Foturan II mentioned above, the permittivity of the glass substrate 10 is about 6.4. On the other hand, if the material of the colored insulation layer 30 is, for example, epoxy, the permittivity of the colored insulation layer 30 ranges between about 3.0 and 5.0.

A manufacturing method of an inductor component 1A will now be described.

Figure 8:
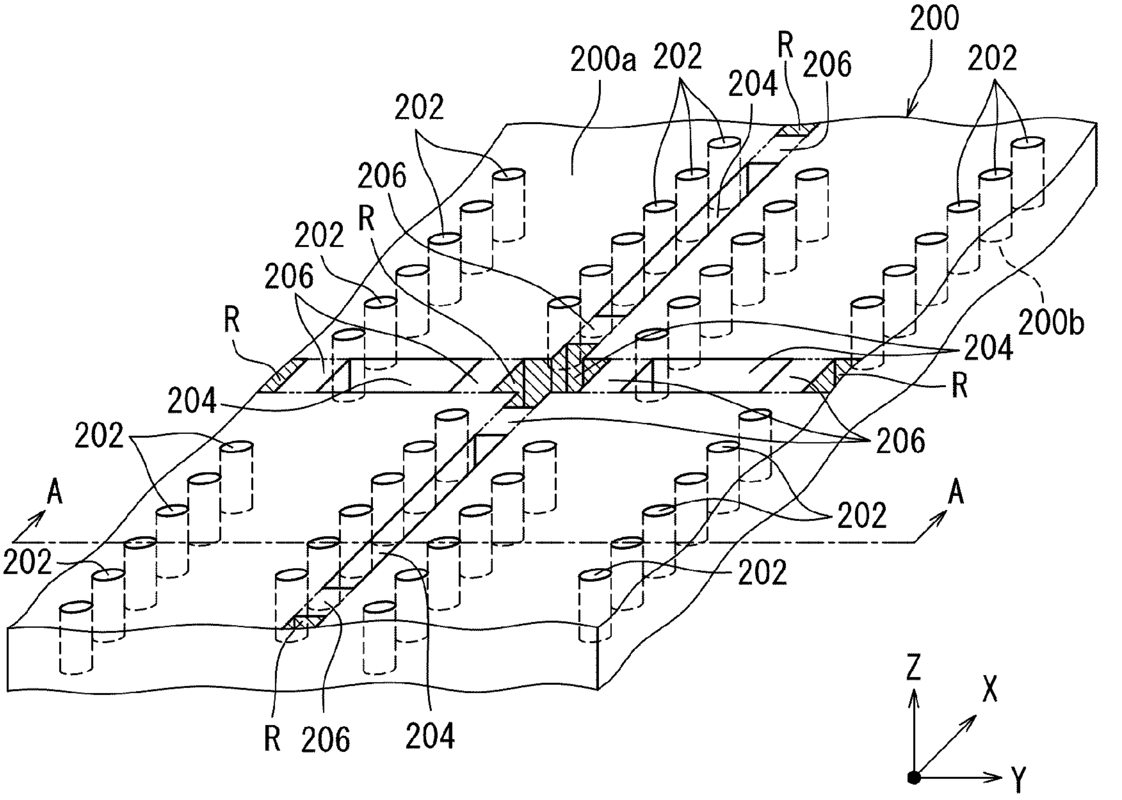
FIG. 8 is a perspective view explaining a manufacturing method of the inductor component.

First, a manufacturing process is performed using a method identical to the manufacturing method according to the first embodiment shown in FIGS. 5A and 5B. Then, portions of the cutting region 203 of the motherboard 200 are irradiated with ultraviolet light and are subsequently crystallized by being heated (e.g., sintered). Subsequently, etching is performed so that the second through-holes 204 are at least formed in regions R of the cutting region 203 that correspond to corners of inductor components (electronic components), as shown in FIG. 8.

The regions R corresponding to the corners of each inductor component are regions that face the corners of the main body of each component to be manufactured, portions of the first side surface of the main body continuing to the corners, and portions of the second side surface of the main body continuing to the corners, and include the positions of the corners of each component to be manufactured. In detail, the regions R corresponding to the corners of each inductor component are regions surrounded by the corners of the main body of each component to be manufactured, the side surfaces of the main body, and the bridge portions 206. In FIG. 8, the regions R corresponding to the corners of each inductor component are hatched.

In a subsequent process, a colored insulation layer is embedded in the second through-holes 204 located in the regions R corresponding to the corners of each inductor component, so that the corners of the main body of each component to be manufactured, the portions of the first side surface of the main body continuing to the corners, and portions of the second side surface of the main body continuing to the corners can be continuously provided with the colored insulation layer. Then, an inductor component 1A is manufactured by using a method identical to the manufacturing method shown in FIG. 5E to FIG. 5K.

Third Embodiment

Figure 9:
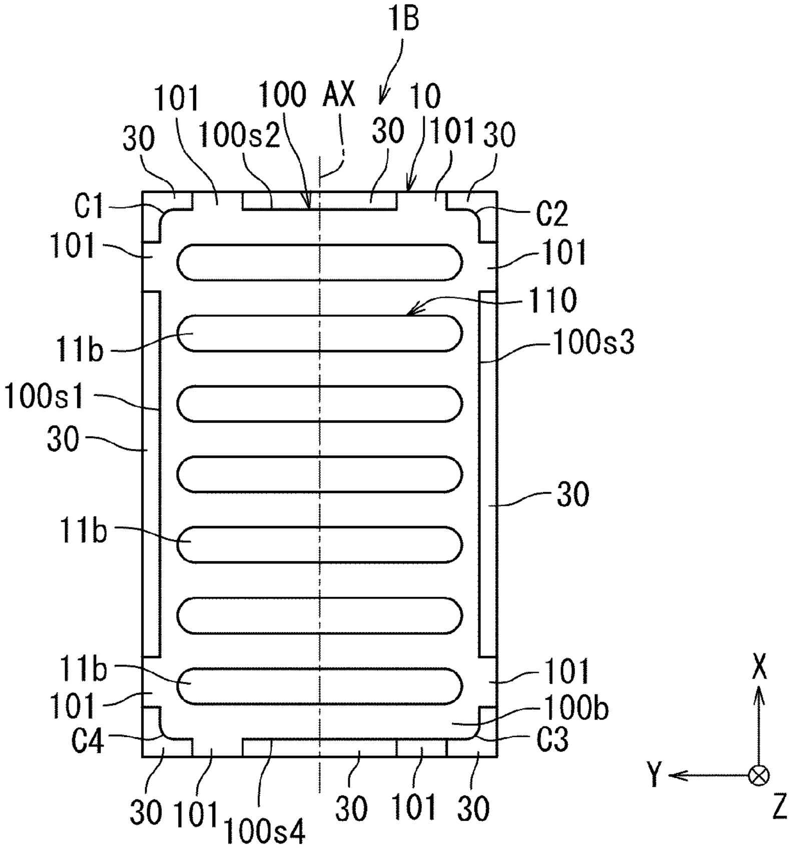
FIG. 9 is a bottom view of a coil of an inductor component as an electronic component according to a third embodiment, as viewed from the bottom surface thereof.

FIG. 9 is a bottom view of a coil of an inductor component as an electronic component according to a third embodiment, as viewed from the bottom surface thereof. FIG. 9 corresponds to FIG. 7. The third embodiment is different from the second embodiment in terms of the shape of each corner of the main body. This difference will be described below. Other configurations are identical to those in the second embodiment, and descriptions thereof will be omitted.

As shown in FIG. 9, the first to fourth corners C1 to C4 each have a curved surface. In this embodiment, a curved surface is a convex surface convexed outward of the main body 100. According to this configuration, chipping and cracking of the first to fourth corners C1 to C4 can be further suppressed. Furthermore, the volume of glass at the first to fourth corners C1 to C4 is reduced, as compared with the case where the first to fourth corners C1 to C4 are ridges, so that the possibility of an occurrence of stray capacitance can be reduced at the first to fourth corners C1 to C4.

Fourth Embodiment

Figure 10:
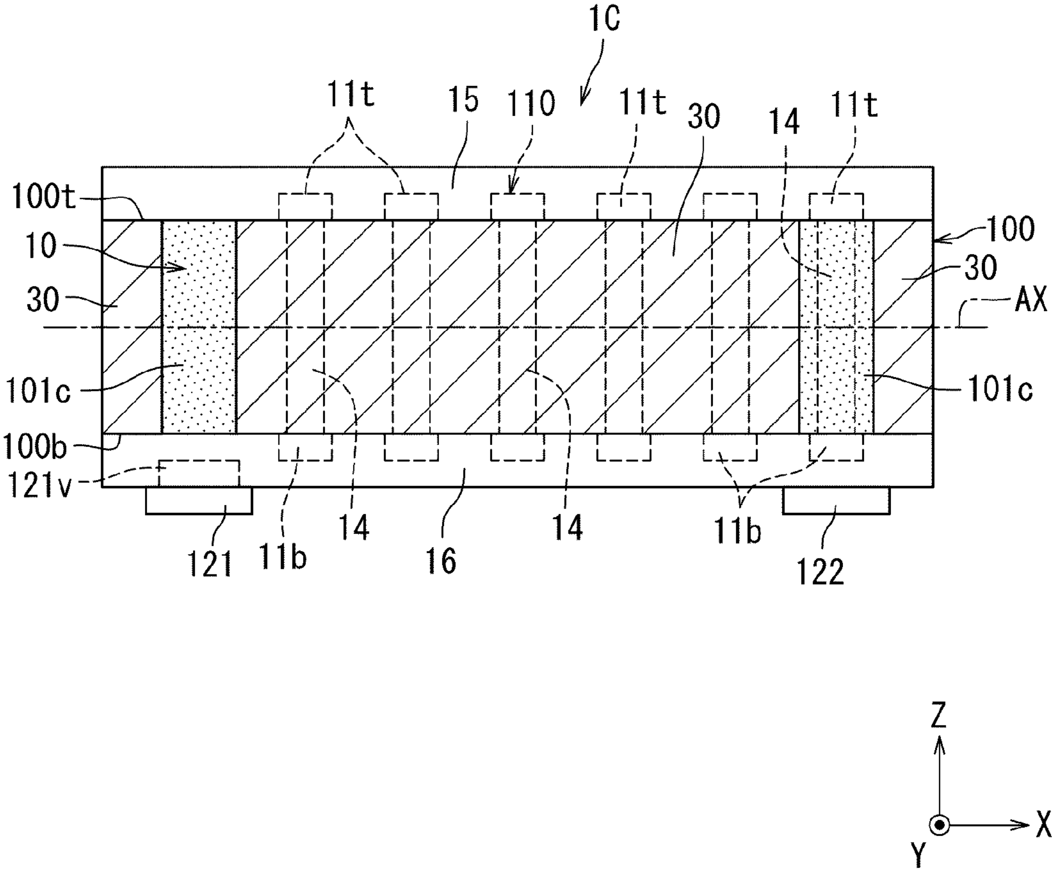
FIG. 10 is a side view of an inductor component as an electronic component according to a fourth embodiment, as viewed from the first side surface thereof.

FIG. 10 is a side view of an inductor component as an electronic component according to a fourth embodiment, as viewed from the first side surface thereof. FIG. 10 corresponds to FIG. 6. In FIG. 10, a position where the colored insulation layer exists is hatched for the sake of convenience, and positions where the protrusions exist are hatched with dots. The fourth embodiment is different from the second embodiment in terms of the configuration of the protrusions. This difference will be described below. Other configurations are identical to those in the second embodiment, and descriptions thereof will be omitted.

As shown in FIG. 10, the first side surface 100*s*1 has crystallized protrusions 101C. The transparency of the crystallized protrusions 101C is lower than the transparency of the non-crystallized main body 100. According to this configuration, since the transparency is low in the protrusions 101C in addition to the colored insulation layer 30, an inductor component 1C can be detected more readily. Furthermore, the mechanical strength of crystallized glass is higher than the mechanical strength of non-crystallized glass. Therefore, the mechanical strength of the inductor component 1C against an external force can be increased, as compared with a case where the protrusions are not crystallized. The second to fourth side surfaces 100*s*2 to 100*s*4 may also have crystallized protrusions. Accordingly, advantages similar to the above advantages of the first side surface 100*s*1 can be achieved.

A manufacturing method of the inductor component 1C will now be described.

Figure 11:
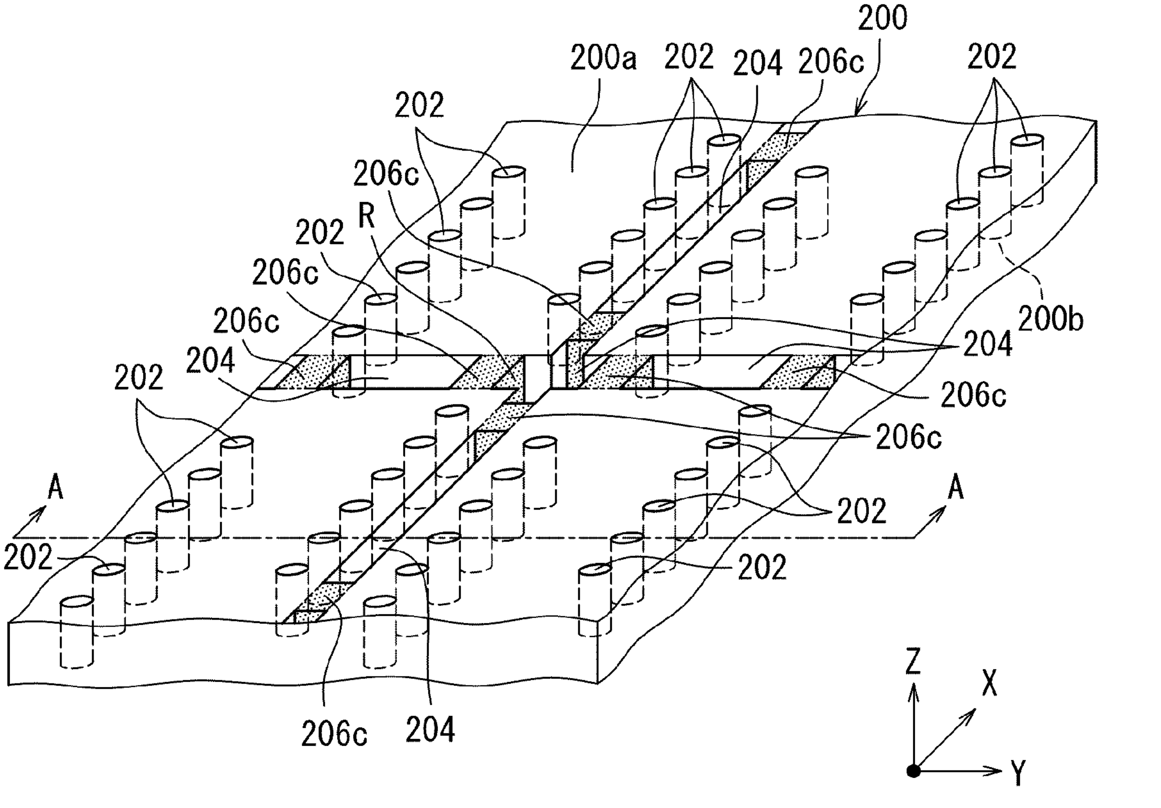
FIG. 11 is a perspective view explaining a manufacturing method of the inductor component.

First, a manufacturing process is performed using a method identical to the manufacturing method according to the first embodiment shown in FIGS. 5A and 5B and according to the second embodiment shown in FIG. 8. Then, as shown in FIG. 11, the bridge portions are irradiated with ultraviolet light and are subsequently heated (e.g., sintered), thereby forming crystallized bridge portions 206C. Subsequently, the inductor component 1C is manufactured by using a method identical to the manufacturing method shown in FIG. 5E to FIG. 5K. The crystallized bridge portions 206C are cut during the splitting process of the motherboard 200, so that the protrusions 101C of the inductor component 1C are formed.

The above manufacturing method of the inductor component 1C further includes a step for irradiating the bridge portions with ultraviolet light and subsequently crystallizing the bridge portions by heating after the step for forming the second through-holes 204 and the bridge portions.

According to the above manufacturing method, the bridge portions are crystallized, and the splitting process of the motherboard 200 is performed by cutting the bridge portions, so that the side surfaces of the split inductor components 1 can be provided with the crystallized protrusions 101C. Moreover, since the bridge portions are crystallized, chipping and cracking of the bridge portions can be suppressed during the splitting process of the motherboard 200.

Fifth Embodiment

Figure 12:
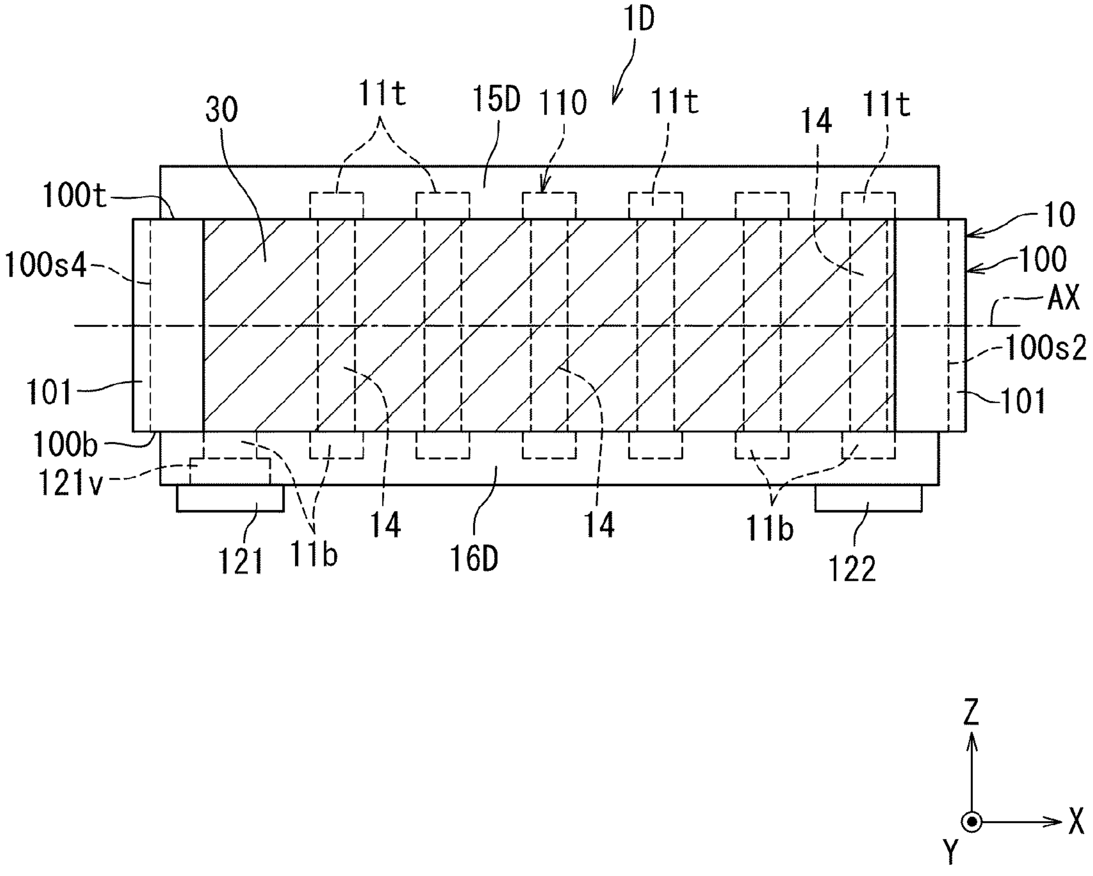
FIG. 12 is a side view of an inductor component as an electronic component according to a fifth embodiment, as viewed from the first side surface thereof.

FIG. 12 is a side view of an inductor component as an electronic component according to a fifth embodiment, as viewed from the first side surface thereof. FIG. 12 corresponds to FIG. 3. In FIG. 12, a position where the colored insulation layer exists is hatched for the sake of convenience. The fifth embodiment is different from the first embodiment in terms of the sizes of the first protection layer and the second protection layer. This difference will be described below. Other configurations are identical to those in the first embodiment, and descriptions thereof will be omitted.

As shown in FIG. 12, as viewed from the Z direction, a first protection layer 15D is provided inward relative to the outer periphery of the top surface 100*t* of the main body 100. Specifically, the size of the first protection layer 15D in an XY plane is smaller than the size in the XY plane of the first protection layer 15 in the inductor component 1 according to the first embodiment. Likewise, as viewed from the Z direction, a second protection layer 16D is provided inward relative to the outer periphery of the bottom surface 100*b* of the main body 100. Specifically, the size of the second protection layer 16D in the XY plane is smaller than the size in the XY plane of the second protection layer 16 in the inductor component 1 according to the first embodiment.

According to the above configuration, when the colored insulation layer 30 and the bridge portions are to be cut along the cutting region 203, as shown in FIG. 5J, during a manufacturing process of an inductor component 1D, since the first protection layer 15D and the second protection layer 16D are provided inward relative to the outer periphery of the top surface 100*t* of the main body 100 and the outer periphery of the bottom surface 100*b*, respectively, as viewed from the Z direction, the dicing blade 300 does not come into contact with the first protection layer 15D and the second protection layer 16D. Therefore, during the cutting process by the dicing blade 300, delamination of the first protection layer 15D and the second protection layer 16D from the glass substrate 10 (motherboard 200) can be suppressed. Alternatively, as viewed from the Z direction, one of the first protection layer 15D and the second protection layer 16D may be provided inward relative to the outer periphery of the top surface 100*t* or the outer periphery of the bottom surface 100*b* of the main body 100.

A manufacturing method of the inductor component 1D will now be described.

Figure 13:
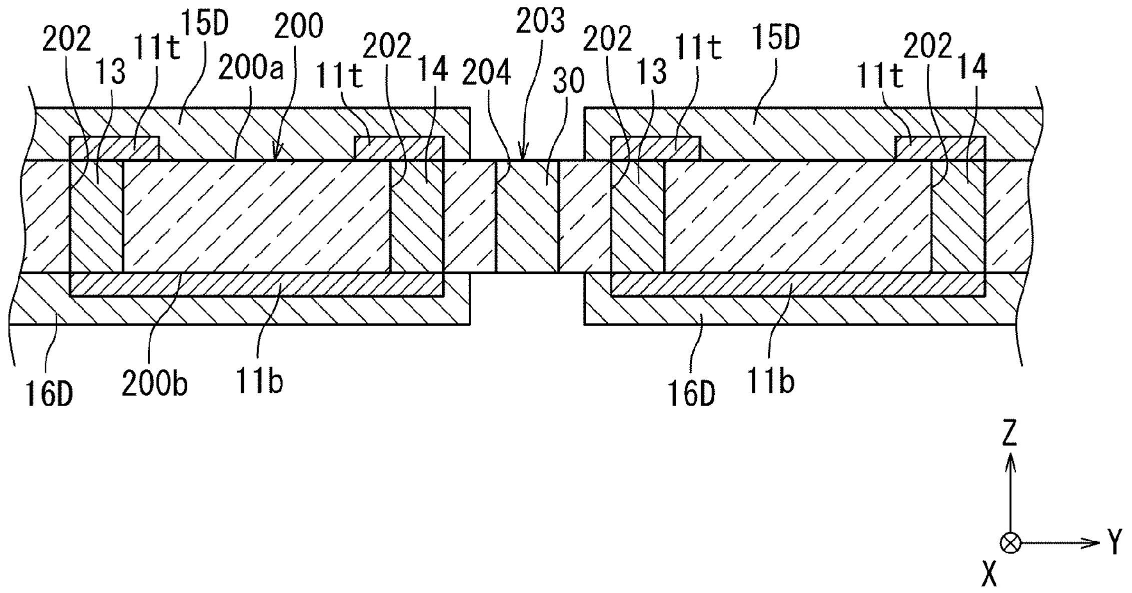
FIG. 13 is a perspective view explaining a manufacturing method of the inductor component.

First, a manufacturing process is performed using a method identical to the manufacturing method according to the first embodiment shown in FIG. 5A to FIG. 5G. Then, as shown in FIG. 13, the first protection layer 15D and the second protection layer 16D are formed inward relative to the side surfaces of the main body of each component. Subsequently, the inductor component 1D is manufactured by using a method identical to the manufacturing method shown in FIGS. 5I to 5K.

In the above manufacturing method of the inductor component 1D, the step for forming the first protection layer 15D and the second protection layer 16D involves forming the first protection layer 15D and the second protection layer 16D without overlapping the cutting region 203, as viewed from the direction (Z direction) orthogonal to the first principal surface 200*a* of the motherboard 200.

According to the above manufacturing method, when the motherboard 200 is to be split by, for example, dicing, contact of the dicing blade with the first protection layer 15D and the second protection layer 16D can be suppressed. As a result, delamination of the first protection layer 15D and the second protection layer 16D from the motherboard 200 can be suppressed.

Sixth Embodiment

Figure 14:
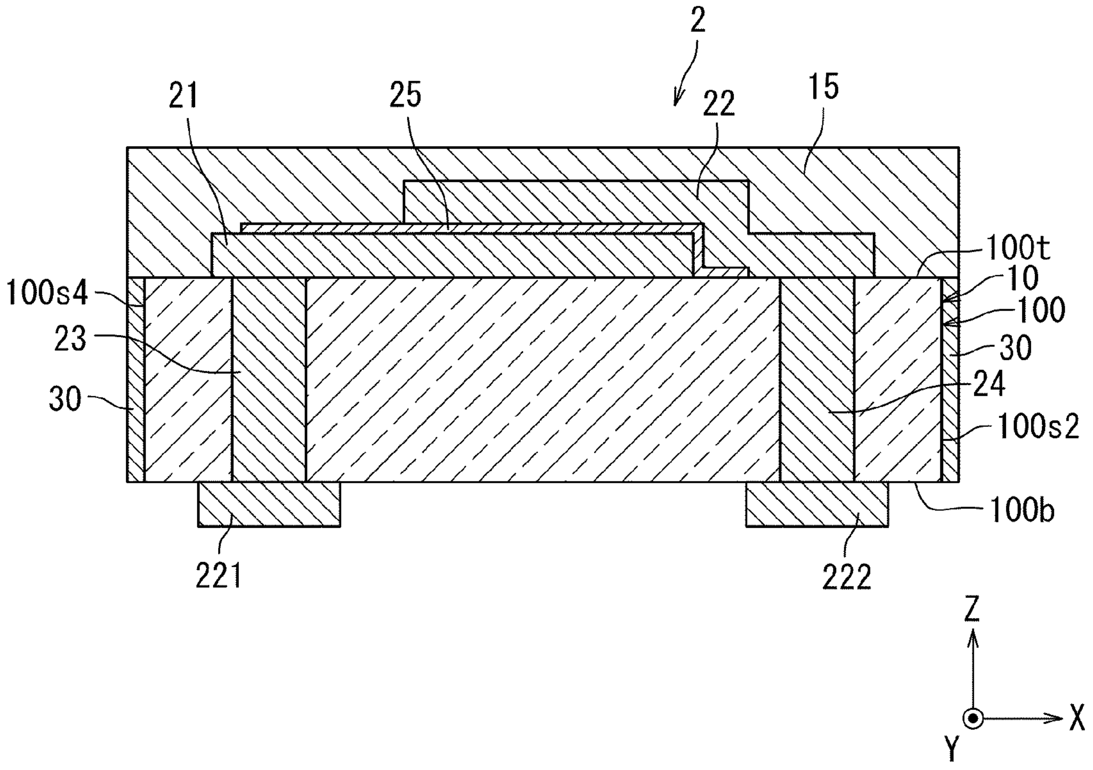
FIG. 14 is a cross-sectional view illustrating a capacitor component as an electronic component according to a sixth embodiment.
Figure 15:
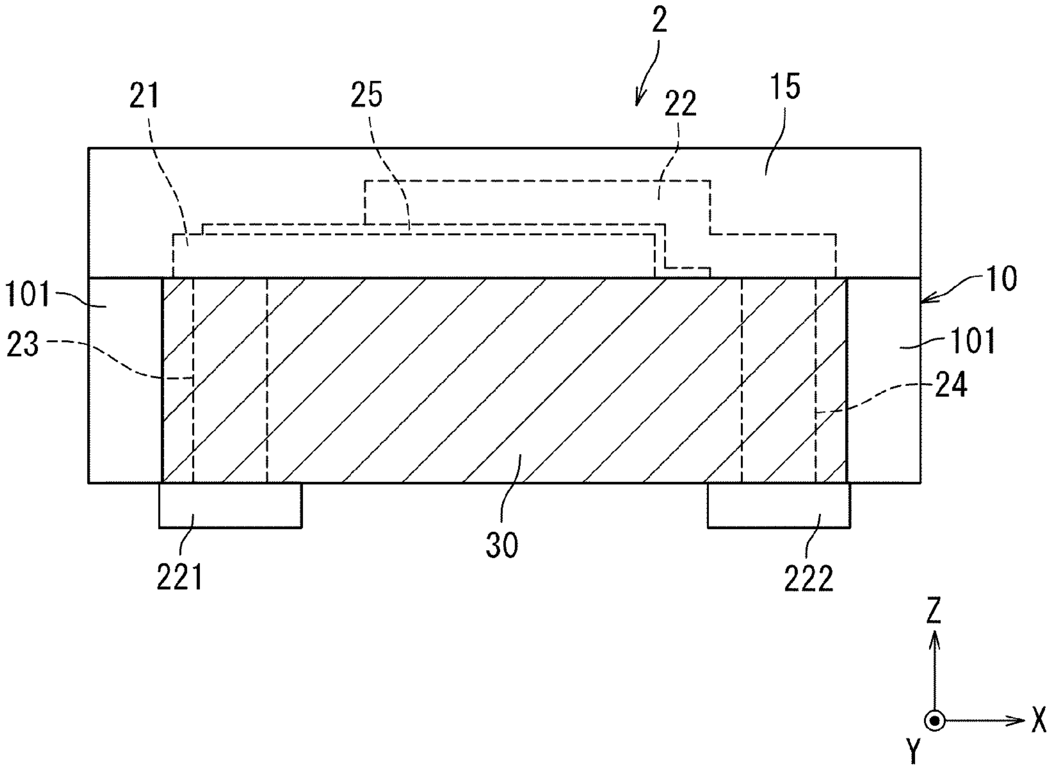
FIG. 15 is a side view of the capacitor component, as viewed from a first side surface thereof.

In a sixth embodiment, the electronic component according to the present disclosure is described as being a capacitor component as an example. FIG. 14 is a cross-sectional view of the capacitor component. FIG. 15 is a side view of the capacitor component, as viewed from a first side surface thereof. A capacitor component 2 is, for example, a surface-mounted capacitor component used in a high-frequency-signal transmission circuit.

As shown in FIGS. 14 and 15, the capacitor component 2 includes a glass substrate 10, a first plate electrode 21 and a second plate electrode 22 that are provided on the glass substrate 10, a first protection layer 15 provided on the glass substrate 10 and covering the first plate electrode 21 and the second plate electrode 22, a colored insulation layer 30 provided on the side surfaces of the glass substrate 10, and a first terminal electrode 221 and a second terminal electrode 222 that are provided on the glass substrate 10. The first plate electrode 21 and the second plate electrode 22 each correspond to an example of an "outer-surface conductor" defined in the claims.

The material of the glass substrate 10 is the same as the material of the glass substrate 10 according to the first embodiment. In other words, the glass substrate 10 has the main body 100 and the protrusions 101. The material of the first protection layer 15 is the same as the material of the first protection layer 15 according to the first embodiment. The material of the colored insulation layer 30 is the same as the material of the colored insulation layer 30 according to the first embodiment. The material of the first plate electrode 21 and the second plate electrode 22 is the same as the material of the top-surface conductors 11*t* and the bottom-surface conductors 11*b* according to the first embodiment. The material of the first terminal electrode 221 and the second terminal electrode 222 is the same as the material of the first terminal electrode 121 and the second terminal electrode 122 according to the first embodiment.

The first plate electrode 21 and the second plate electrode 22 are provided on the top surface 100*t* of the glass substrate 10. The first plate electrode 21 is in contact with the top surface 100*t* of the glass substrate 10, and the second plate electrode 22 is located above the first plate electrode 21. The first plate electrode 21 and the second plate electrode 22 have a dielectric film 25 provided therebetween. The first plate electrode 21, the second plate electrode 22, and the dielectric film 25 constitute a capacitor element.

The first terminal electrode 221 and the second terminal electrode 222 are in contact with the bottom surface 100*b* of the glass substrate 10. The first terminal electrode 221 and the second terminal electrode 222 are disposed away from each other.

The capacitor component 2 further has a first through-conductor 23 and a second through-conductor 24 that extend through the glass substrate 10. The first through-conductor 23 is connected between the first terminal electrode 221 and the first plate electrode 21. The second through-conductor 24 is connected between the second terminal electrode 222 and the second plate electrode 22.

Similar to the first embodiment, the first side surface 100*s*1 to the fourth side surface 100*s*4 of the main body 100 are provided with the protrusions 101 and the colored insulation layer 30. Alternatively, at least one of the first side surface 100*s*1 to the fourth side surface 100*s*4 may be provided with the protrusions 101 and the colored insulation layer 30.

According to the above configuration, the colored insulation layer 30 is provided on the first side surface 100*s*1 of the main body 100, so that when the capacitor component 2 is to be detected from the first side surface 100*s*1 of the main body 100 by using a detector, such as a laser sensor or a camera, the colored insulation layer 30 with low transparency can be readily recognized, whereby the capacitor component 2 can be readily detected.

Furthermore, as viewed from the direction orthogonal to the first side surface 100*s*1, the colored insulation layer 30 extends in the Z direction. Thus, when the capacitor component 2 is to be detected by scanning the detector in the Z direction, the colored insulation layer 30 can be readily recognized, whereby the capacitor component 2 can be readily detected.

Moreover, since the colored insulation layer 30 is provided on the first side surface 100*s*1 of the main body 100, the exposed area of the main body 100 can be reduced, and the mechanical strength of the capacitor component 2 against an external force can be increased.

The second side surface 100*s*2, the third side surface 100*s*3, and the fourth side surface 100*s*4 have configurations and advantages similar to those of the first side surface 100*s*1. The above configuration may be satisfied with respect to at least one of the first to fourth side surfaces 100*s*1 to 100*s*4.

The present disclosure is not limited to the above embodiments, and design modifications are permissible so long as they do not depart from the scope of the present disclosure. For example, the features of the first to sixth embodiments may be variously combined. Although an inductor component is used as the electronic component in each of the first to fifth embodiments, and a capacitor component is used as the electronic component in the sixth embodiment, another electronic component, such as a resistor component, may be used, or a composite component having a combination of these components may be used.

As an alternative to the first to fifth embodiments in which the top surface and the bottom surface of the main body are provided with the respective outer-surface conductors (i.e., the bottom-surface conductors and the top-surface conductors) and the top surface and the bottom surface are provided with the respective protection layers (i.e., the first protection layer and the second protection layer) to cover the outer-surface conductors, at least one of the top surface and the bottom surface of the main body may be provided with an outer-surface conductor, and at least one of the surfaces may be provided with a protection layer to cover the outer-surface conductor. As another alternative, each of the top surface and the bottom surface does not have to be provided with a protection layer.

The present disclosure includes the following aspects.

1. An electronic component comprising a glass substrate having a main body and a protrusion, the main body including a top surface, a bottom surface, and a first side surface connecting the bottom surface and the top surface to each other, the first side surface of the main body being provided with the protrusion; a colored insulation layer provided on at least the first side surface of the main body; and a through-conductor provided within the main body and extending through the top surface and the bottom surface. The protrusion extends in a first direction that is orthogonal to the top surface, as viewed from a direction orthogonal to the first side surface. As viewed from the direction orthogonal to the first side surface, at least a portion of the colored insulation layer extends in the first direction and is disposed adjacent to the protrusion in a second direction that is orthogonal to the first direction.
2. The electronic component according to aspect 1, wherein an area where the first side surface does not have the protrusion is entirely provided with the colored insulation layer.
3. The electronic component according to aspect 1 or 2, wherein the main body further includes a second side surface and a corner between the first side surface and the second side surface, the second side surface connecting the bottom surface and the top surface to each other and being adjacent to the first side surface in a circumferential direction, as viewed from a direction orthogonal to the bottom surface. Also, the colored insulation layer is continuously provided on the first side surface, the corner, and the second side surface.
4. The electronic component according to any one of aspects 1 to 3, wherein the main body further includes a second side surface and a corner between the first side surface and the second side surface, the second side surface connecting the bottom surface and the top surface to each other and being adjacent to the first side surface in a circumferential direction, as viewed from a direction orthogonal to the bottom surface. Also, the corner has a curved surface.
5. The electronic component according to any one of aspects 1 to 4, further comprising an outer-surface conductor that is disposed above at least one of the top surface and the bottom surface and that is electrically connected to the through-conductor; and a protection layer provided above the at least one of the top surface and the bottom surface to cover the outer-surface conductor.
6. The electronic component according to any one of aspects 1 to 5, wherein at least a center of the first side surface is provided with the colored insulation layer.
7. The electronic component according to any one of aspects 1 to 6, wherein the glass substrate has two of the protrusions arranged in the second direction at the first side surface, and at least a portion of the colored insulation layer is disposed between the two protrusions and is adjacent to each of the two protrusions in the second direction.
8. The electronic component according to any one of aspects 1 to 7, wherein, at the first side surface, a width of the colored insulation layer in the second direction is larger than a width of the protrusion in the second direction.
9. The electronic component according to any one of aspects 1 to 8, wherein, as viewed from the direction orthogonal to the first side surface, the through-conductor includes two through-conductors neighboring each other in the second direction, the protrusion overlaps one of the two neighboring through-conductors, and the colored insulation layer overlaps a region between the two neighboring through-conductors.
10. The electronic component according to any one of aspects 1 to 9, wherein the protrusion is crystallized.
11. A manufacturing method of an electronic component, comprising a step for preparing a motherboard composed of photosensitive glass and including a first principal surface and a second principal surface; a step for irradiating a portion of a cutting region of the first principal surface with ultraviolet light and subsequently crystallizing the portion of the cutting region by heating; and a step for forming a through-hole and a bridge portion, the step including removing the crystallized portions of the cutting region by etching to form the through-hole extending through the first principal surface and the second principal surface of the motherboard and to form the bridge portion extending from the first principal surface to the second principal surface of the motherboard in an area of the cutting region excluding an area provided with the through-hole. The method also includes a step for forming a through-conductor extending through the first principal surface and the second principal surface of the motherboard; a step for embedding a colored insulation layer in the through-hole and bringing the colored insulation layer into contact with the bridge portion; and a step for splitting the motherboard into a plurality of electronic components by cutting the colored insulation layer and the bridge portion along the cutting region.
12. The manufacturing method of the electronic component according to aspect 11, wherein the step for forming the through-hole and the bridge portion includes forming the through-hole at least in an area of the cutting region corresponding to a corner of the electronic component.
13. The manufacturing method of the electronic component according to aspect 11 or 12, further comprising a step for forming an outer-surface conductor electrically connected to the through-conductor above at least one of the first principal surface and the second principal surface; and a step for forming a protection layer above the at least one of the first principal surface and the second principal surface to cover the outer-surface conductor. The step for forming the outer-surface conductor and the step for forming the protection layer are performed prior to the step for splitting the motherboard into the plurality of electronic components.
14. The manufacturing method of the electronic component according to aspect 13, wherein the step for forming the protection layer includes forming the protection layer without overlapping the cutting region, as viewed from a direction orthogonal to the first principal surface of the motherboard.
15. The manufacturing method of the electronic component according to any one of aspects 11 to 14, further comprising a step for irradiating the bridge portion with ultraviolet light and subsequently crystallizing the bridge portion by heating, after the step for forming the through-hole and the bridge portion.

What is claimed is:

1. An electronic component comprising:

a glass substrate having a main body and a protrusion, the main body including a top surface, a bottom surface, and a first side surface connecting the bottom surface and the top surface to each other, the first side surface of the main body including the protrusion;

a colored insulation layer on at least the first side surface of the main body; and a through-conductor within the main body and extending through the top surface and the bottom surface, wherein the protrusion extends in a first direction that is orthogonal to the top surface, as viewed from a direction orthogonal to the first side surface, as viewed from the direction orthogonal to the first side surface, at least a portion of the colored insulation layer extends in the first direction and is disposed adjacent to the protrusion in a second direction that is orthogonal to the first direction.

2. The electronic component according to claim 1, wherein an area of the first side surface where the protrusion is absent entirely includes the colored insulation layer.

3. The electronic component according to claim 1, wherein the main body further includes a second side surface and a corner between the first side surface and the second side surface, the second side surface connecting the bottom surface and the top surface to each other and being adjacent to the first side surface in a circumferential direction, as viewed from a direction orthogonal to the bottom surface, and the colored insulation layer is continuously on the first side surface, the corner, and the second side surface.

4. The electronic component according to claim 1, wherein the main body further includes a second side surface and a corner between the first side surface and the second side surface, the second side surface connecting the bottom surface and the top surface to each other and being adjacent to the first side surface in a circumferential direction, as viewed from a direction orthogonal to the bottom surface, and the corner has a curved surface.

5. The electronic component according to claim 1, further comprising:

an outer-surface conductor that is disposed above at least one of the top surface and the bottom surface and that is electrically connected to the through-conductor; and a protection layer above the at least one of the top surface and the bottom surface to cover the outer-surface conductor.

6. The electronic component according to claim 1, wherein at least a center of the first side surface includes the colored insulation layer.

7. The electronic component according to claim 1, wherein the glass substrate has two of the protrusions arranged in the second direction at the first side surface, and at least a portion of the colored insulation layer is between the two protrusions and is adjacent to each of the two protrusions in the second direction.

8. The electronic component according to claim 1, wherein at the first side surface, a width of the colored insulation layer in the second direction is larger than a width of the protrusion in the second direction.

9. The electronic component according to claim 1, wherein as viewed from the direction orthogonal to the first side surface, the through-conductor includes two through-conductors neighboring each other in the second direction, the protrusion overlaps one of the two neighboring through-conductors, and the colored insulation layer overlaps a region between the two neighboring through-conductors.

10. The electronic component according to claim 1, wherein the protrusion is crystallized.

11. The electronic component according to claim 2, wherein the main body further includes a second side surface and a corner between the first side surface and the second side surface, the second side surface connecting the bottom surface and the top surface to each other and being adjacent to the first side surface in a circumferential direction, as viewed from a direction orthogonal to the bottom surface, and the colored insulation layer is continuously on the first side surface, the corner, and the second side surface.

12. The electronic component according to claim 2, wherein the main body further includes a second side surface and a corner between the first side surface and the second side surface, the second side surface connecting the bottom surface and the top surface to each other and being adjacent to the first side surface in a circumferential direction, as viewed from a direction orthogonal to the bottom surface, and the corner has a curved surface.

13. The electronic component according to claim 2, further comprising:

an outer-surface conductor that is disposed above at least one of the top surface and the bottom surface and that is electrically connected to the through-conductor; and a protection layer above the at least one of the top surface and the bottom surface to cover the outer-surface conductor.

14. The electronic component according to claim 2, wherein at least a center of the first side surface includes the colored insulation layer.

15. The electronic component according to claim 2, wherein the glass substrate has two of the protrusions arranged in the second direction at the first side surface, and at least a portion of the colored insulation layer is between the two protrusions and is adjacent to each of the two protrusions in the second direction.

* * * * *